United States Patent
Aoki et al.

(10) Patent No.: US 9,824,425 B2
(45) Date of Patent: *Nov. 21, 2017

(54) IMAGE QUALITY ENHANCING APPARATUS, IMAGE DISPLAY APPARATUS, IMAGE QUALITY ENHANCING METHOD, AND COMPUTER READABLE STORAGE MEDIUM

(71) Applicant: EIZO Corporation, Ishikawa (JP)

(72) Inventors: Reo Aoki, Ishikawa (JP); Haifeng Chen, Ishikawa (JP); Masafumi Higashi, Ishikawa (JP); Hiroki Matsuzaki, Ishikawa (JP); Tadayoshi Katagiri, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 14 days.

This patent is subject to a terminal disclaimer.

(21) Appl. No.: 15/139,329

(22) Filed: Apr. 27, 2016

(65) Prior Publication Data

US 2016/0253782 A1 Sep. 1, 2016

Related U.S. Application Data

(63) Continuation of application No. PCT/JP2014/078844, filed on Oct. 30, 2014.

(30) Foreign Application Priority Data

Nov. 1, 2013 (JP) .................................. 2013-228769

(51) Int. Cl.
G06K 9/40 (2006.01)
G06T 3/40 (2006.01)
(Continued)

(52) U.S. Cl.
CPC .......... *G06T 3/4076* (2013.01); *G06T 3/4053* (2013.01); *G06T 5/001* (2013.01);
(Continued)

(58) Field of Classification Search
CPC ........ G06T 3/4076; G06T 5/003; G06T 5/50; G06T 5/001; G06T 5/005; G06T 5/20;
(Continued)

(56) References Cited

U.S. PATENT DOCUMENTS 4,853,970 A * 8/1989 Ott ............................ G06T 7/12
382/199
5,563,962 A * 10/1996 Peters ....................... G06T 5/50
382/261
(Continued)

OTHER PUBLICATIONS

Office Action issued for counterpart Japanese Application 2015-545283, issued by the Japan Patent Office dated Feb. 21, 2017.
(Continued)

*Primary Examiner* — Amir Alavi

(57) ABSTRACT

An image quality enhancing apparatus, an image display apparatus, an image quality enhancing method, and a computer readable storage medium which make a learning-type image quality enhancing method utilizing a sparse expression practical are provided. The image quality enhancing apparatus calculates, from the feature quantity of an image, coefficients of low-image-quality base vectors expressing a feature quantity with a linear sum and generates the image with the enhanced image quality by calculating a linear sum of high-image-quality base vectors using the calculated coefficient. When calculating the coefficient, T base vectors highly influential on the feature quantity are selected from among a plurality of base vectors and an analytic solution making L2 norm of a coefficient matrix α as small as possible is calculated. A sparse solution of the coefficients
(Continued)

can be obtained without using the iteration method and a practical image quality enhancing apparatus can be realized.

13 Claims, 20 Drawing Sheets

(51) Int. Cl.
*H04N 7/01* (2006.01)
*G06T 5/00* (2006.01)
*G06T 5/20* (2006.01)
*G06T 5/40* (2006.01)

(52) U.S. Cl.
CPC ............... *G06T 5/005* (2013.01); *G06T 5/20* (2013.01); *G06T 5/40* (2013.01); *H04N 7/0117* (2013.01); *G06T 2207/20081* (2013.01)

(58) Field of Classification Search
CPC ............ G06T 5/40; G06T 2207/20192; G06T 2207/20221; G06T 2207/20081; G06T 2207/20024; G06T 3/4053; G06K 9/40
See application file for complete search history.

(56) References Cited

U.S. PATENT DOCUMENTS

| | | | | |
|---|---|---|---|---|
| 5,592,571 | A * | 1/1997 | Peters | G06T 5/50 382/130 |
| 6,731,821 | B1 * | 5/2004 | Maurer | G06K 9/40 382/263 |
| 9,202,267 | B1 * | 12/2015 | Yang | G06T 5/002 |
| 2004/0042677 | A1 * | 3/2004 | Lee | G06K 9/00456 382/254 |
| 2005/0001805 | A1 * | 1/2005 | Jeon | G02F 1/136286 345/92 |
| 2011/0234644 | A1 * | 9/2011 | Park | G09G 3/2003 345/690 |
| 2016/0239712 | A1 * | 8/2016 | Kitano | G06T 7/246 |
| 2016/0253782 | A1 * | 9/2016 | Aoki | G06T 3/4053 382/168 |
| 2016/0253783 | A1 * | 9/2016 | Higashi | G06T 3/4053 382/168 |

OTHER PUBLICATIONS

Jianchao Yang, et al., "Image Super-Resolution via Sparse Representation", IEEE Transactions on Image Processing, IEEE, 2010-11, vol. 19, No. 11, p. 2861-2873 (pp. 1-13).

International Search Report for International Patent Application No. PCT/JP2014/078844, issued by the Japan Patent Office dated Dec. 2, 2014.

Toshiyuki Kato et al., "Sparse Coding o Mochiita Multiframe Chokaizo", IPSJ SIG Notes, May 23, 2013 (May 23, 2013), vol. 2013-CVIM-187, No. 3, pp. 1 to 9. (cited in ISR).

Kengo Making et al., "Kinbo Patch no Joho ni Motozuku Omomi o Riyo shita Sparse Saikosei ni yoru Ichimai Chokaizo", IPSJ SIG Notes, May 23, 2013 (May 23, 2013), vol. 2013-CVIM-187, No. 16, pp. 1 to 6. (cited in ISR).

Tatsuya Harada, "Large Scale Generic Image Recognition and Image Representation", IEICE Technical Report, Feb. 10, 2011 (Feb. 10, 2011), vol. 110, No. 414, pp. 61 to 74. (cited in ISR).

Makoto Nakashizuka, "Sparse Signal Representations and its Applications to Image processing", The Journal of the Institute of Image Information and Television Engineers, Oct. 1, 2011 (Oct. 1, 2011), vol. 65, No. 10, pp. 33 to 38. (cited in ISR).

Blondel Mathieu et al., "Learning Robust Sparse Kernel Classifiers", IPSJ SIG Notes, Feb. 15, 2012 (Feb. 15, 2012), vol. 2011-MPS-86, No. 2, pp. 1 to 8. (cited in ISR).

* cited by examiner

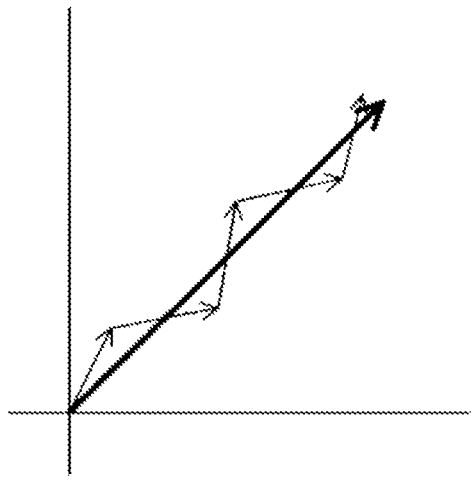
F I G . 3A
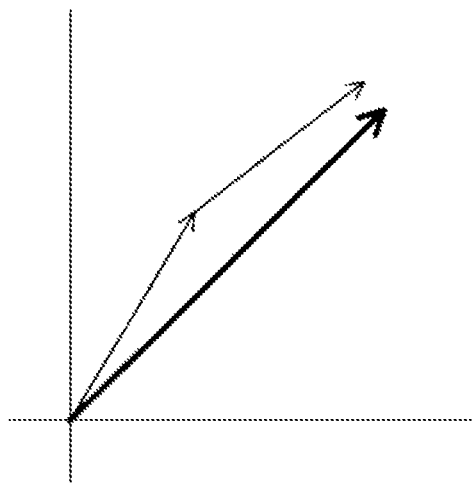
F I G . 3B

IMAGE QUALITY ENHANCING APPARATUS, IMAGE DISPLAY APPARATUS, IMAGE QUALITY ENHANCING METHOD, AND COMPUTER READABLE STORAGE MEDIUM

The contents of the following patent applications are incorporated herein by reference: No. JP2013-228769 filed on Nov. 1, 2013 and No. PCT/JP2014/078844 filed on Oct. 30, 2014.

BACKGROUND

1. Technical Field

The present invention relates to an image quality enhancement method of an image, more specifically, an image quality enhancing apparatus, an image display apparatus, an image quality enhancing method, and a computer readable storage medium, which execute a learning-type image quality enhancing method utilizing sparse expression.

2. Related Art

An image is sometimes enlarged when handling an image such as when displaying an image, etc. When the pixel count is simply increased to enlarge the image, a problem that the resolution decreases and the image quality degrades occurs. In order to solve this problem, a technique to enhance an image quality of an image is being developed. For example, a technique of a learning-type super-resolution is being developed. In the learning-type super-resolution technique, a dictionary which has learned in advance a correspondence relationship between a low-quality image and a high-quality image is created, and the image quality of an image is enhanced by extracting a high-quality image corresponding to an actual low-quality image from the dictionary.

As one method of the learning-type super-resolution, Non-Patent Document 1 discloses a learning-type image quality enhancing method which utilizes a sparse expression. In Non-Patent Document 1, the image quality enhancement is carried out by the procedures as the following. A high frequency component of the luminance is extracted from a small region (referred to as a patch below) with each pixel in the image at the center. The high frequency component here is a component that is changing with a high frequency of higher than or equal to a predetermined spatial frequency within the luminance distribution in a patch. The extracted high frequency component of the luminance indicates the luminance distribution in the patch. The degradation of an image quality occurs by a downsampling or enlarging, and this degradation of the image quality occurs in a high frequency component of the luminance. The high frequency component of the luminance expresses a feature of the image, and thus the extracted high frequency component of the luminance is the feature quantity of the image. A feature quantity of any image can be expressed by a combination of a plurality of predetermined fundamental feature quantities. The feature quantity is expressed by vectors, and the plurality of predetermined fundamental feature quantities are called base vectors. The feature quantity of any image is expressed by a linear sum of a plurality of base vectors. The one-on-one correspondence relationship between a low-image-quality base vector and a high-image-quality base vector is learned in advance, and a dictionary data in which the learned contents are recorded is created. Based on the feature quantity of the image, a coefficient of each base vector for expressing the feature quantity with the linear sum of a plurality of low-image-quality base vectors is determined. At this time, the coefficient is determined such that the number of the base vectors with non-zero coefficients is as small as possible. To make the number of the base vectors with non-zero coefficients as small as possible is called a sparse expression. By multiplying each of the high-image-quality base vectors by the coefficients of the corresponding low-image-quality base vectors, and by calculating the sum of the high-image-quality base vectors multiplied by the coefficients, a high frequency component of the luminance is reconstructed. The reconstructed high frequency component is the high frequency component of the luminance of a high-quality image. By combining the low frequency component of the luminance and the reconstructed high frequency component of the luminance, a high-quality image is generated.

The feature quantity of an image is to be expressed with a linear sum of the base vectors with non-zero coefficients. The coefficients of almost all base vectors become zero by using the sparse expression, so the operation amount decreases. Also, by the sparse expression, the feature quantity of the image is expressed by the base vector that is the most influential, and thus a base vector selected does not change even if the feature quantity of the image varied in some degree due to the noise. Therefore, a robust result can be obtained for the noise. Then, it becomes important how the sparse expression is realized.

A set of a plurality of base vectors is D, a coefficient matrix consisting of the coefficients of the base vectors is α, and the feature quantity of the image is y. With m and n as natural numbers, D is a matrix with m lines and n columns, α is a matrix with n lines and one column, and y is a matrix with m lines and one column. Since the feature quantity of the image is expressed with the linear sum of a plurality of base vectors, Dα=y holds. If m=n, a solution of α can be uniquely obtained. However, there is no guarantee that the solution of the α obtained here is a sparse solution. Also, if m<n, the solution where L2 norm of α becomes minimum can be obtained by a solution method using a general inverse matrix. However, also in this case, there is no guarantee that a sparse solution of α can be obtained.

In Non-Patent Document 1, Dα=y is not considered a strict condition, and a that is more sparse is selected from among the α's where Dα≈y. Specifically, an operation to solve the conditional equation expressed by Equation (1) below is performed.

[Eq. 1]

$$\min_{\alpha} \lVert D\alpha - y \rVert_2^2 + \lambda \lVert \alpha \rVert_1 \qquad (1)$$

The $\lVert \cdot \rVert_1$ is L1 norm, $\lVert \cdot \rVert_2$ is L2 norm in Equation (1), and λ is a parameter referred to as a sparse constraint term. The meaning of Equation (1) is to solve for α such that $\lVert \alpha \rVert_1$ is preferably small and the difference between the linear sum of the base vectors and the feature quantity is small. The α where $\lVert \alpha \rVert_1$ becomes as small as possible is a sparse solution. A differentiation of L1 norm is generally difficult, and solving Equation (1) analytically is difficult. In Non-Patent Document 1, a solution of Equation (1) is obtained by letting the solution converge by the iteration method.

PRIOR ART DOCUMENTS

Non-Patent Document

Non-Patent Document 1: Jianchao Yang, et al., "Image Super-Resolution Via Sparse Representation", IEEE Transactions on Image Processing, IEEE, 2010-11, vol. 19, no. 11, p. 2861-2873

The method of obtaining a sparse solution of a coefficient matrix by the iteration method in Non-Patent Document 1 may be utilized in a situation where the real-time performance is not required. However, when the real-time performance is required such as when enlarging an image and performing an image quality enhancement on the enlarged image to display the image on an image display apparatus, a delay of processing occurs. Also, the cost of the circuit for executing the process increases in order to decrease the delay of processing. Therefore, in the present circumstances, there is a problem that a learning-type image quality enhancing method which utilizes a sparse expression is not practical.

The present invention has been made in view of such conditions, and its purpose is to provide an image quality enhancing apparatus, an image display apparatus, an image quality enhancing method, and a computer readable storage medium, which make a learning-type image quality enhancing method utilizing a sparse expression practical by reducing the processing amount for solving for a sparse solution.

SUMMARY

An image quality enhancing apparatus according to the present invention comprises a section which stores a plurality of first feature quantities which can express feature quantities which are high frequency components in any image with a linear sum thereof, a section which stores a plurality of second feature quantities indicating a high-image-quality high frequency component corresponding to the first feature quantities, a coefficient calculating section which calculates, from a feature quantity of an image targeted for image quality enhancement, a coefficient for expressing the feature quantity with a linear sum of the plurality of first feature quantities, and a section which generates a high frequency component of an image that is the image with the image quality enhanced, by replacing each of the first feature quantities included in the linear sum that has used a coefficient calculated by the coefficient calculating section with corresponding second feature quantities, the image quality enhancing apparatus characterized in that the coefficient calculating section comprises a selecting section which selects fewer first feature quantities than the total number of the plurality of first feature quantities and a calculating section which calculates a coefficient to be multiplied by the first feature quantities selected by the selecting section.

The image quality enhancing apparatus according to the present invention is characterized in that the calculating section is configured to make a sum of squares of differences between the linear sum and the feature quantities of the image targeted for image quality enhancement as small as possible, and furthermore to calculate a coefficient in order to make a sum of squares of coefficients used in the linear sum as small as possible.

The image quality enhancing apparatus according to the present invention is characterized in that the calculating section is configured to calculate an analytic solution of a coefficient which minimizes a weighted sum of the sum of squares of the differences between the linear sum of the first feature quantities selected by the selecting section and the feature quantity of the image targeted for image quality enhancement and the sum of squares of the coefficients used in the linear sum.

The image quality enhancing apparatus according to the present invention is characterized in that the selecting section is configured to select a predetermined number of first feature quantities that are the closest to the feature quantities of the image targeted for the image quality enhancement from among the plurality of first feature quantities.

The image quality enhancing apparatus according to the present invention is characterized in that the feature quantity of an image, the first feature quantity, and the second feature quantity are expressed with vectors of the same dimension, and that the selecting section comprises a section which calculates inner products of each of the vectors of the plurality of first feature quantities and the vector of the feature quantity of the image, and a section which selects a predetermined number of first feature quantities in descending order of the values of the inner products calculated by the section which calculates the inner products.

The image quality enhancing apparatus according to the present invention comprises a section which stores a plurality of low-image-quality base vectors, a section which stores a plurality of high-image-quality base vectors corresponding to the low-image-quality base vectors, a coefficient calculating section which calculates a coefficient to be a sparse expression, and a section which generates an image with an enhanced image quality based on the coefficient calculated by the coefficient calculating section and the high-image-quality base vectors corresponding to the low-image-quality base vectors, the image quality enhancing apparatus characterized in that the apparatus comprises a selecting section which selects fewer number of base vectors than the total number of the low-image-quality base vectors based on the feature quantity, and the coefficient calculating section is configured to calculate a coefficient as a sparse solution by calculating an analytic solution without using the iteration method based on the low-image-quality base vectors selected by the selecting section and the feature quantity of the image.

The image display apparatus according to the present invention is characterized in that the apparatus comprises an image quality enhancing apparatus according to the present invention and a section which displays an image on which the image quality enhancing apparatus performed an image quality enhancement.

The image quality enhancing method according to the present invention comprises storing a plurality of first feature quantities which can express a feature quantity that is a high frequency component in any image with a linear sum thereof, storing a plurality of second feature quantities indicating a high frequency component with a high image quality corresponding to the first feature quantities, and generating a high frequency component of an image that is the image with the image quality enhanced by calculating from the feature quantity of the image which has been targeted for the image quality enhancement a coefficient for expressing the feature quantity with the linear sum of the plurality of first feature quantities and replacing each of the first feature quantities included in the linear sum which used the calculated coefficient with corresponding second feature quantities, the image quality enhancing method characterized in that it comprises selecting fewer first feature quantities than the total number of the plurality of first feature quantities and calculating a coefficient to be multiplied by the selected first feature quantities.

A non-transitory computer readable storage medium according to the present invention stores a computer program for causing a computer, which stores a plurality of first feature quantities which can express a feature quantity that is a high frequency component in any image with a linear sum thereof and stores a plurality of second feature quantities indicating a high frequency component with a high image quality corresponding to the first feature quantities, to execute a coefficient calculating step to calculate a coefficient from a feature quantity of an image targeted for image quality enhancement for expressing the feature quantity with the linear sum of the plurality of first feature quantities, and a step to generate a high frequency component of an image that is an image with the image quality enhanced is performed by replacing each of the first feature quantities included in the linear sum which has used the calculated coefficient with corresponding second feature quantities, the non-transitory computer readable storage medium characterized in that the coefficient calculating step includes a step to select fewer first feature quantities than the total number of the plurality of first feature quantities and a step to calculate a coefficient to be multiplied by the selected first feature quantities.

In the present invention, the image quality enhancing apparatus calculates, from the feature quantity of an image, a coefficient for expressing a feature quantity with a linear sum of the low-image-quality first feature quantities, and calculates a linear sum of the second feature quantities of a high image quality by using the coefficient calculated to generate an image with the image quality enhanced. The image display apparatus displays an image on which an image quality enhancement has been performed. At this moment, the image quality enhancing apparatus selects a few first feature quantities from among a plurality of first feature quantities and calculates a coefficient. The coefficient is calculated after limiting the number of the first feature quantities to a few, and thus a sparse solution can be obtained easily without using the iteration method.

Also, in the present invention, the image quality enhancing apparatus can obtain a sparse solution by calculating coefficients such that a sum of squares of the difference between a linear sum of the first feature quantities and the feature quantity of an image targeted for image quality enhancement becomes small and a sum of squares of the coefficients becomes small.

Also, in the present invention, the image quality enhancing apparatus can calculate coefficients analytically by calculating an analytic solution of the coefficient which minimizes a weighted sum of the sum of squares of the difference between the linear sum of the first feature quantities and the feature quantity of the image targeted for the image quality enhancement and the sum of squares of the coefficients.

Also, in the present invention, the image quality enhancing apparatus selects a predetermined number of the first feature quantities that is the closest to the feature quantity of the image, enabling an approximation of the feature quantity with the linear sum of the selected first feature quantities. For this reason, a sparse solution of the coefficient is obtained.

Also, in the present invention, the image quality enhancing apparatus selects a predetermined number of the first feature quantities that is the closest to the feature quantity by selecting the predetermined number of the first feature quantities in descending order of the values of inner products of the vectors of the first feature quantities and the vectors of the feature quantity of the image.

In the present invention, the image quality enhancing apparatus calculates a coefficient for expressing the feature quantity of the image with the linear sum of low-image-quality base vectors and generates an image with the image quality enhanced by calculating a linear sum of high-image-quality base vectors by using the calculated coefficient. At this time, the image quality enhancing apparatus selects a few base vectors and calculates a sparse solution of the coefficient without using the iteration method based on the selected low-image-quality base vectors and the feature quantity of the image.

EFFECT OF THE INVENTION

In the present invention, the image quality enhancing apparatus is able to calculate a sparse solution of the coefficient for expressing the feature quantity of the image with a linear sum of the first feature quantities without using the iteration method. For this reason, the processing duration necessary for the calculation of the coefficient shortens, and a delay in the process by the image quality enhancement of an image decreases even when a real-time performance is required. Therefore, the present invention has a superior effect that a learning-type image quality enhancing method which utilizes a sparse expression becomes sufficiently practical, etc.

BRIEF DESCRIPTION OF THE DRAWINGS

FIG. 3A is a schematic view for comparing an exact solution of a coefficient matrix with a sparse solution.

FIG. 3B is a schematic view for comparing an exact solution of a coefficient matrix with a sparse solution.

DESCRIPTION OF EXEMPLARY EMBODIMENTS

The present invention is specifically described below based on the figures showing the embodiments.

(Embodiment 1)

Figure 1:
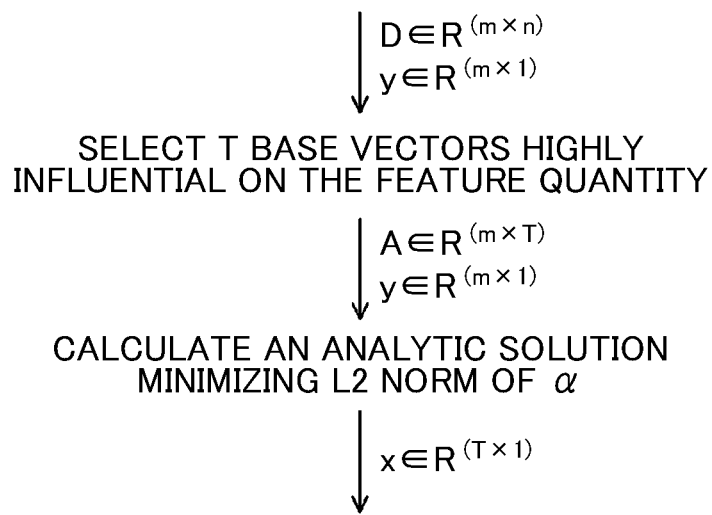
FIG. 1 is a conceptual diagram showing the outline of a method of calculating a sparse solution of a coefficient matrix $\alpha$ in Embodiment 1.

In the present embodiment, a sparse solution of a coefficient matrix $\alpha$ is calculated without using the iteration method. FIG. 1 is a conceptual diagram showing an outline of the method of calculating the sparse solution of the coefficient matrix $\alpha$ in Embodiment 1. In the present embodiment, T base vectors that are highly influential on the feature quantity of an image are selected from among n base vectors recorded in dictionary data. Here, T<n. Then, a sparse solution of the coefficient matrix $\alpha$ is calculated by calculating an analytic solution which minimizes an evaluation function of the coefficient matrix $\alpha$, by using the selected T base vectors.

Figure 2:
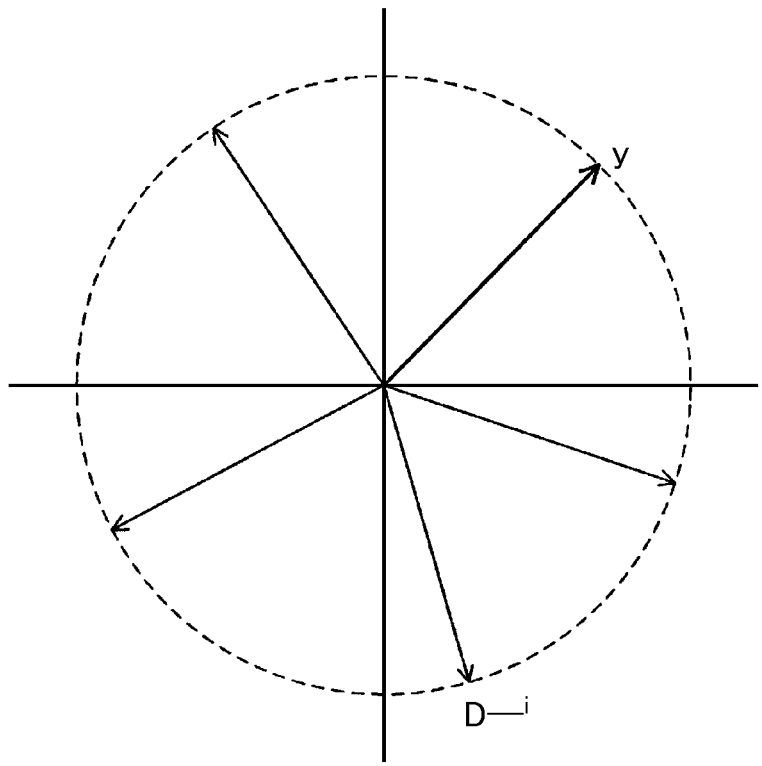
FIG. 2 is a schematic view conceptually expressing the relationship between a feature quantity of an image and a plurality of base vectors.

FIG. 2 is a schematic view which expresses conceptually the relationship between the feature quantity y of an image and a plurality of base vectors. Matrix D with m lines and n columns is a matrix in which n base vectors D_i (i=1 to n) consisting of m elements are aggregated, and the feature quantity y is a vector consisting of m elements. In FIG. 2, the feature quantity y and the plurality of base vectors D_i are shown on a two-dimensional plane for the sake of simplicity. Assuming that the feature quantity y and the plurality of base vectors D_i are normalized, a unit circle is shown with a dashed line in FIG. 2. Obtaining the solution of a coefficient matrix $\alpha$ is the same as selecting several base vectors D_i from among n base vectors D_i and expressing the feature quantity y with a linear sum of the selected base vectors D_i. At this time, the fewer the number of the base vectors D_i used to express the feature quantity y, the sparser the solution.

FIGS. 3A and 3B are schematic views for comparing an exact solution of the coefficient matrix $\alpha$ with a sparse solution. In the figures, the feature quantity y is shown with bold arrows, and base vectors D_i are shown with thin arrows. FIG. 3A shows an exact solution of the coefficient matrix $\alpha$. The feature quantity y is expressed exactly with a linear sum of a plurality of base vectors D_i. FIG. 3B shows a sparse solution of the coefficient matrix $\alpha$. In the sparse solution, although the linear sum of the plurality of base vectors D_i does not exactly coincide with the feature quantity y, it approximates the feature quantity y. Also, the feature quantity y is expressed with a linear sum of fewer base vectors D_i compared to the exact solution. It is obvious that the base vectors which are close to the vectors of the feature quantity y should be selected in order to obtain a sparse solution. In the present embodiment, T base vectors which are the closest to the vector of the feature quantity y are selected as the base vectors which are highly influential on the feature quantity of the image. Specifically, inner products of all of the base vectors and the feature quantity y are calculated, and T base vectors are selected in descending order of the values of the inner products. Then, a set A of the selected base vectors is created. A is a matrix with m lines and T columns.

In a step to calculate an analytic solution of the coefficient matrix $\alpha$, an evaluation function $J(\alpha)$ which assumes $\|D\alpha-y\|_2$ and $\|\alpha\|_2$ as cost functions is defined, and a solution which minimizes $J(\alpha)$ is calculated. The evaluation function $J(\alpha)$ is defined by Equation (2) below.

[Eq. 2]

$$J(\alpha) = \|D\alpha - y\|_2^2 + \lambda \|\alpha\|_2^2 \quad (2)$$

The parameter $\lambda$ in Equation (2) is a constant. Comparing Equation (1) with Equation (2), the L1 norm of $\alpha$ in Equation (1) is replaced with a square of the L2 norm of $\alpha$ in Equation (2). If $\alpha$ which minimizes $J(\alpha)$ is obtained, then $\alpha$ that makes $\|\alpha\|_2$ as small as possible and a difference between the linear sum of the base vectors and the feature quantity y is small is obtained. Also, by adjusting the value of the parameter $\lambda$, the balance between the L2 norm of $\alpha$ and the error from $D\alpha=y$ can be adjusted. The larger the $\lambda$, the more influential the L2 norm becomes, and the number of non-zero coefficients decreases in order to make the L2 norm of $\alpha$ smaller. $\lambda$ is a value less than 1, for example, 0.1. The condition for extreme values in Equation (2) is expressed by Equation (3) below.

[Eq. 3]

$$\delta J/\delta \alpha = 2D^T D\alpha - 2D^T y + 2\lambda \alpha = 0 \quad (3)$$

If Equation (3) is arranged for $\alpha$, the $\alpha$ can be obtained by Equation (4) below.

[Eq. 4]

$$\alpha = (DD^T + \lambda)^{-1} D^T y \quad (4)$$

Although an analytic solution can be obtained by Equation (4) in this manner, it is not guaranteed that the solution obtained by Equation (4) is a sparse solution, because a constraint is applied to the L2 norm in Equation (2) whereas the constraint is applied to the L1 norm in Equation (1). Now, as described above, T base vectors which are highly influential on the feature quantity y are selected, and a solution is calculated by using a set A of the selected base vectors. Specifically, the solution is calculated by using Equation (5) below, in which D in Equation (4) is replaced with A.

[Eq. 5]

$$x = (AA^T + \lambda)^{-1} A^T y \quad (5)$$

The solution x obtained by Equation (5) is a matrix with T rows and 1 column and consists of the coefficients of T base vectors which are highly influential on the feature quantity y among the coefficients included in the coefficient matrix $\alpha$. Among the coefficients included in the coefficient matrix $\alpha$, the coefficients other than the coefficients included in x are zero. Since the solution x is a solution calculated from a set A of T base vectors which are highly influential on the feature quantity y, it is a sparse solution. As above, in the present embodiment, a sparse solution of the coefficient matrix is calculated by selecting T base vectors which are highly influential on the feature quantity y of an image from among n base vectors and calculating the solution x by Equation (5) which uses the set A of the selected base vectors. For this reason, it becomes possible to calculate a sparse solution of the coefficient matrix α without using the iteration method. Matrix calculation using the matrix A in which the number of base vectors is decreased to be fewer than the matrix D is performed, and no repetition of calculations is performed. Thus, the amount of necessary calculations decreases.

Figure 4:
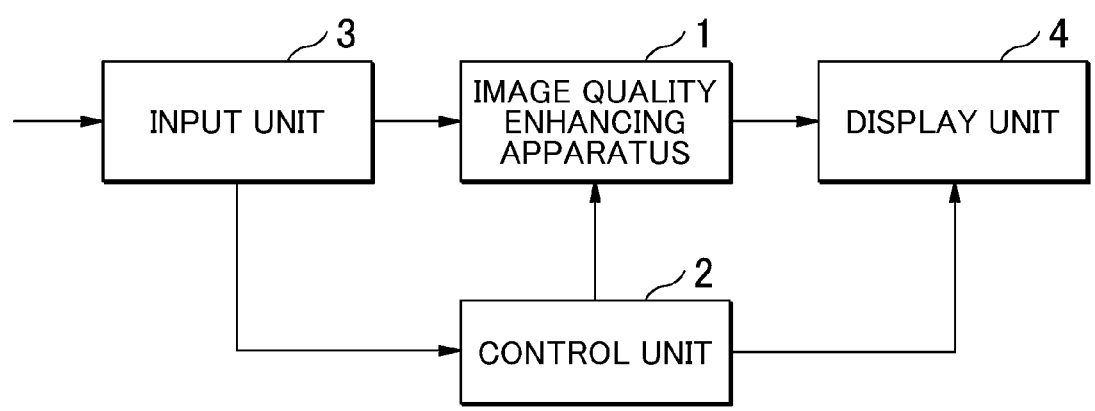
FIG. 4 is a block diagram showing the configuration of internal functions of an image display apparatus according to the present invention.

FIG. 4 is a block diagram showing the configuration of internal functions of the image display apparatus according to the present invention. The image display apparatus comprises a display unit 4 which displays an image, an input unit 3 through which an image signal expressing an image is input, an image quality enhancing apparatus 1, and a control unit 2 which controls each unit. The display unit 4 is configured to display an image by using an image display device such as a liquid crystal panel or EL (Electro Luminescence) panel. The input unit 3 is an interface through which image signals including color signals of R (red), G (green), and B (blue) expressing the colors of each pixel included in the image are input from outside. For example, the image display apparatus is a monitor for a computer, and an image signal is input into the input unit 3 from the main body of the computer. The input unit 3 inputs the image signal into the image quality enhancing apparatus 1. Also, various types of control signals are input into the input unit 3, and the input unit 3 inputs the control signals into a control unit 2. An image signal is input into the image quality enhancing apparatus 1 from the input unit 3, and the image quality enhancing apparatus 1 executes a process to perform the image quality enhancement of the image expressed by the image signal and inputs the image signal expressing an image with the image quality enhanced into the display unit 4. The display unit 4 displays an image based on the image signal input from the image quality enhancing apparatus 1. The control unit 2 is configured to include an operation unit and a storage unit which stores a control program and various types of information. The control unit 2 may perform a control to display an image of which the image quality is not enhanced on the display unit 4. The image display apparatus may be an apparatus which displays either a still image or a moving image and may be an apparatus which displays both. Also, the image display apparatus may comprise a function to generate an image signal and input a generated image into the input unit 3 like a television receiver, etc. that displays an image based on broadcast signals received by an antenna.

Figure 5:
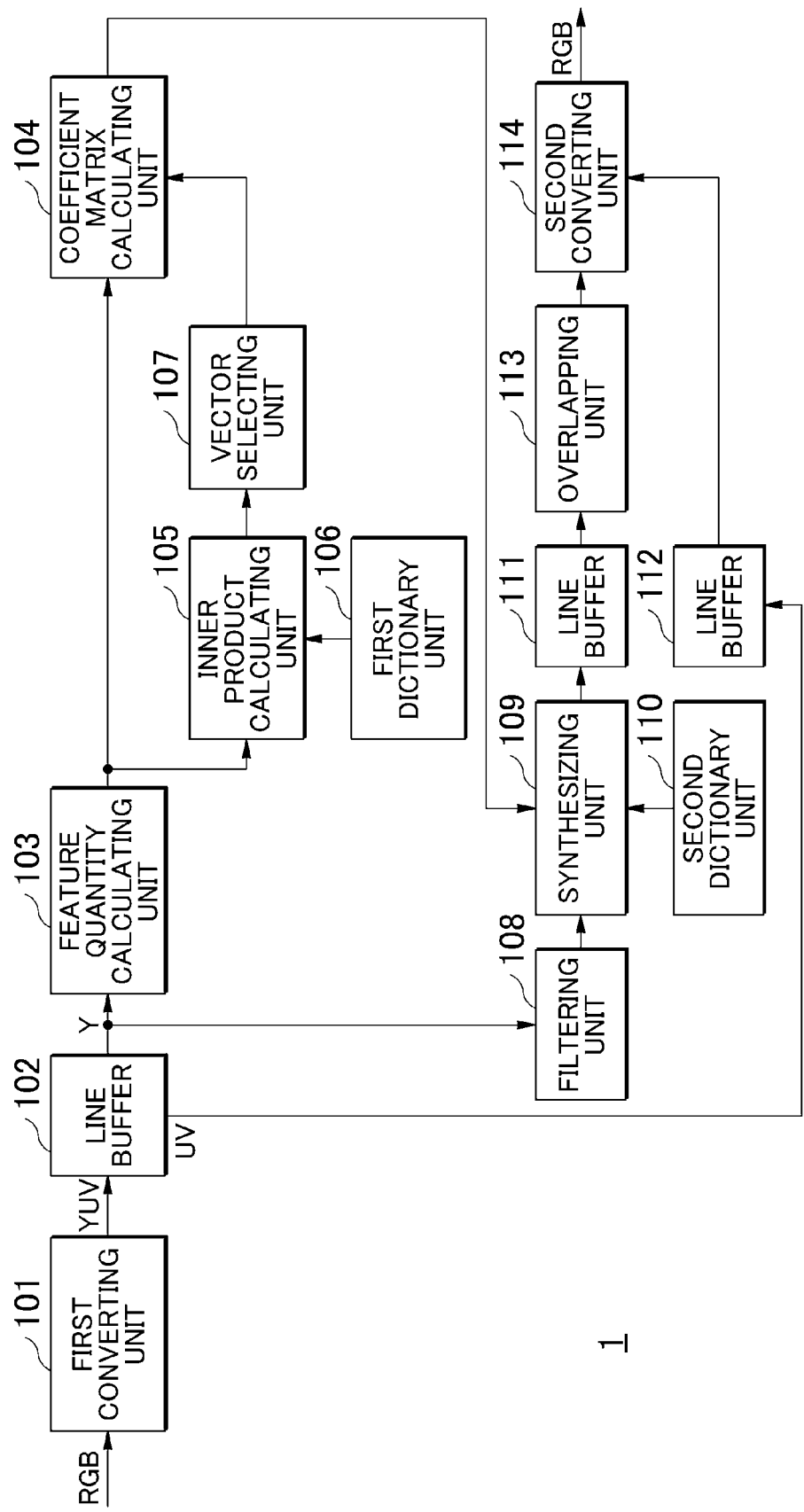
FIG. 5 is a block diagram showing the configuration of internal functions of the image quality enhancing apparatus according to Embodiment 1.

FIG. 5 is a block diagram showing the configuration of internal functions of the image quality enhancing apparatus 1 according to Embodiment 1. The image quality enhancing apparatus 1 comprises a first converting unit 101 which converts image signals. An image signal is input into the first converting unit 101 from the input unit 3 and the first converting unit 101 converts color signals of RGB included in the image signal into a luminance signal Y as well as color-difference signals U and V. A line buffer 102 realized by a memory is connected to the first converting unit 101. The first converting unit 101 inputs an image signal into the line buffer 102 after converting the image signal. The line buffer 102 stores the image signal of each pixel included in an image for a predetermined number of lines. A feature quantity calculating unit 103 which calculates the feature quantity indicating the luminance distribution of the image, a filtering unit 108, and a line buffer 112 are connected to the line buffer 102. The line buffer 102 inputs the luminance signal Y of a plurality of pixels included in a single patch in an image into the feature quantity calculating unit 103 and the filtering unit 108. The single patch is a small image consisting of a plurality of pixels with a single pixel in the image at the center. The line buffer 102 sequentially inputs into the feature quantity calculating unit 103 the luminance signals of the patch with each pixel in the image at the center. Also, the line buffer 102 sequentially inputs into the line buffer 112 the color-difference signals U and V of each pixel in the image.

The feature quantity calculating unit 103 calculates the feature quantity of the patch from the input luminance signals of the patch. Specifically, the feature quantity calculating unit 103 calculates a first differential component and a second differential component in the horizontal direction and vertical direction of the luminance signals of the patch by using a Sobel filter. The component obtained by calculation is a high frequency component of the luminance distribution in the patch, and it is the feature quantity of the present invention. Here, the feature quantity calculating unit 103 extracts a high frequency component higher than or equal to a predetermined spatial frequency among the spatial frequency components of the luminance distribution in the patch as a feature quantity. For example, the feature quantity calculating unit 103 extracts a component other than DC components. The feature quantity calculating unit 103 generates a vector of the feature quantity y with the calculated high frequency component as the component. The vector of the feature quantity y is an m-dimensional vector. The feature quantity calculating unit 103 may calculate a high frequency component by using a filter other than the Sobel filter such as a Laplacian filter, and may calculate the high frequency component by using a plurality of filters.

The filtering unit 108 calculates a low frequency component of the luminance distribution in the patch from the luminance signal of the patch which has been input. Here, the filtering unit 108 extracts a low frequency component lower than or equal to a predetermined spatial frequency among the spatial frequency components of the luminance distribution in the patch. For example, the filtering unit 108 extracts a DC component. Specifically, the filtering unit 108 calculates the DC component of the luminance distribution in the patch by using a filter which calculates an average of the luminance signals of the patch in the horizontal direction and that in the vertical direction. In this manner, the image quality enhancing apparatus 1 separates the luminance signals of the patch into a high frequency component and a low frequency component.

An inner product calculating unit 105 which calculates an inner product of vectors is connected to the feature quantity calculating unit 103. A first dictionary unit 106 which stores dictionary data in which a low-image-quality base vector (corresponding to the first feature quantity) learned in advance is recorded is connected to the inner product calculating unit 105. In the dictionary data stored in the first dictionary unit 106, n low-image-quality m-dimensional base vectors are recorded. Each base vector is the feature quantity of a predetermined fundamental image. Generally, m<n. The feature quantity calculating unit 103 inputs the feature quantity y into the inner product calculating unit 105. The inner product calculating unit 105 calculates inner products of each of the n base vectors recorded in the dictionary data stored by the first dictionary unit 106 and the vector of the feature quantity y.

A vector selecting unit 107 which selects a base vector that is highly influential on the feature quantity is connected to the inner product calculating unit 105. The inner product calculating unit 105 inputs the inner product it calculated into the vector selecting unit 107. The vector selecting unit 107 compares the inner products of n base vectors and the vector of the feature quantity y and selects T base vectors among the n base vectors in descending order of the values of the inner products of the vector of the feature quantity y. Here, T<n. The value of T is stored in advance in the vector selecting unit 107. The feature quantity y is expressed with a linear sum of the selected T base vectors.

A coefficient matrix calculating unit 104 which calculates a coefficient matrix $\alpha$ is connected to the feature quantity calculating unit 103 and the vector selecting unit 107. The feature quantity calculating unit 103 inputs the vector of the feature quantity y into the coefficient matrix calculating unit 104 and the vector selecting unit 107 inputs the selected T base vectors into the coefficient matrix calculating unit 104. The coefficient matrix calculating unit 104 creates matrix A with m lines and T columns in which T base vectors are aggregated and calculates, from the vector of the feature quantity y and the matrix A, a sparse solution x of the coefficient matrix $\alpha$ by calculating an analytic solution that minimizes the L2 norm of the coefficient matrix $\alpha$. Specifically, the coefficient matrix calculating unit 104 calculates a solution x by using Equation (5). T coefficients are included in the solution x. The value of $\lambda$ necessary for the calculation is stored in advance in the coefficient matrix calculating unit 104. The high frequency component of the patch of a high image quality is expressed with a linear sum of high-image-quality T base vectors corresponding to the coefficients included in the solution x.

A synthesizing unit 109 which synthesizes a high frequency component and a low frequency component of the luminance of the patch is connected to the filtering unit 108 and the coefficient matrix calculating unit 104. The filtering unit 108 inputs the low frequency component of the luminance of the patch into the synthesizing unit 109, and the coefficient matrix calculating unit 104 inputs a sparse solution x of the coefficient matrix $\alpha$ into the synthesizing unit 109. Also, a second dictionary unit 110, which stores the dictionary data in which a high-image-quality base vector (corresponding to a second feature quantity) learned in advance is recorded, is connected to the synthesizing unit 109. In the dictionary data stored by the second dictionary unit 110, n high-image-quality m-dimensional base vectors corresponding to the n base vectors recorded in the dictionary data stored by the first dictionary unit 106 are recorded. The high-image-quality base vector is a high frequency component of an image with the image quality enhanced for a predetermined fundamental image in which the corresponding low-image-quality base vector indicates the luminance distribution. The synthesizing unit 109 selects T base vectors corresponding to T coefficient included in the sparse solution x of the coefficient matrix $\alpha$ from among the n base vectors recorded in the dictionary data stored by the second dictionary unit 110. In more detail, the high-image-quality base vectors corresponding to the low-image-quality base vectors to be multiplied by each of the T coefficients included in the solution x in the linear sum of base vectors is selected. Next, the synthesizing unit 109 calculates a high-image-quality high frequency component by multiplying each of the selected base vectors with corresponding coefficients and by calculating the sum of the base vectors multiplied by the coefficients. The synthesizing unit 109 then calculates the luminance signal of the patch with a high image quality by adding the calculated high frequency component with a high image quality and the low frequency component input from the filtering unit 108 with each other. As above, the process of the learning-type image quality enhancement utilizing a sparse expression is executed by the feature quantity calculating unit 103, the coefficient matrix calculating unit 104, the inner product calculating unit 105, the first dictionary unit 106, the vector selecting unit 107, and the synthesizing unit 109. The image quality enhancement process is sequentially executed for each of the patches included in the image.

A line buffer 111 is connected to the synthesizing unit 109. The synthesizing unit 109 inputs the calculated luminance signal of the patch into the line buffer 111, and the line buffer 111 stores the input luminance signal of the patch. The synthesizing unit 109 inputs the luminance signal for each of the patches included in the image sequentially into the line buffer 111, and the line buffer 111 stores the luminance signal which has been sequentially input. An overlapping unit 113 is connected to the line buffer 111. The line buffer 111 inputs the luminance signals of the plurality of patches into the overlapping unit 113. The overlapping unit 113 extracts the luminance signal of the pixel corresponding to a single pixel in the image from the plurality of patches in which the pixel corresponding to the single pixel in the image is included and calculates the luminance signal of the single pixel in the image by superimposing a plurality of luminance signals which it extracted. For example, the overlapping unit 113 calculates the luminance signal of a single pixel by calculating an average or a weighted average of a plurality of luminance signals. The overlapping unit 113 sequentially calculates the luminance signal of each pixel in the image.

A second converting unit 114 which converts an image signal is connected to the overlapping unit 113 and the line buffer 112. The overlapping unit 113 sequentially inputs the luminance signals of each pixel in the image into the second converting unit 114. The line buffer 112 stores a color-difference signal which has been input from the line buffer 102 and sequentially inputs the color-difference signal of each pixel in the image into the second converting unit 114. The second converting unit 114 converts the luminance signal Y input from the overlapping unit 113 and the color-difference signals U and V input from the line buffer 112 into color signals of RGB. The second converting unit 114 is connected to the display unit 4 and inputs image signals including the color signals of RGB into the display unit 4. The display unit 4 displays an image based on the image signals input from the image quality enhancing apparatus 1. In this manner, the image with the image quality enhanced is displayed. For example, when the image signals of an image that has been enlarged by increasing the pixel count are input into the image display apparatus, the image display apparatus displays an image after performing an image quality enhancement of the image quality that has been degraded by enlarging.

Figure 6:
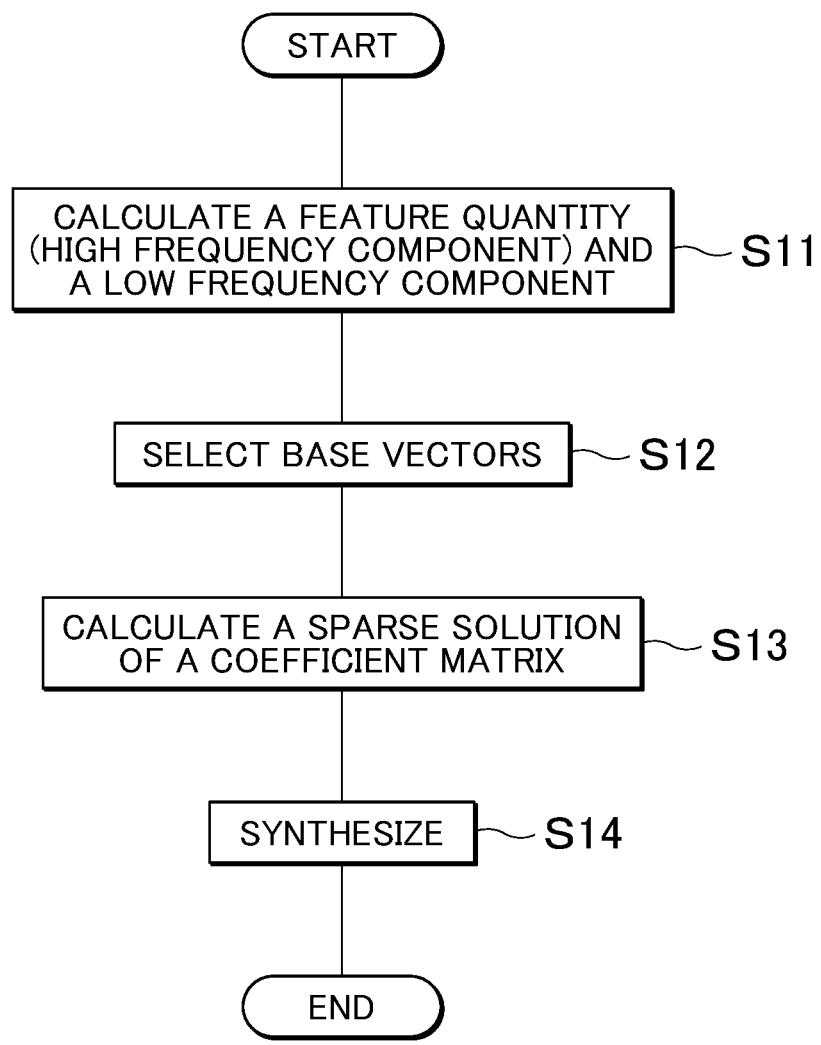
FIG. 6 is a flowchart showing the procedure of an image quality enhancement process executed by the image quality enhancing apparatus according to Embodiment 1.

FIG. 6 is a flowchart showing the procedure of the image quality enhancement process executed by the image quality enhancing apparatus 1 according to Embodiment 1. The feature quantity calculating unit 103 calculates the feature quantity that is a high frequency component of the luminance of the patch, and the filtering unit 108 calculates a low frequency component of the luminance of the patch (S11). The inner product calculating unit 105 and the vector selecting unit 107 select T base vectors that are highly influential on the feature quantity from among n low-image-quality base vectors (S12). The coefficient matrix calculating unit 104 calculates a sparse solution x of the coefficient matrix $\alpha$ from the selected T base vectors and the feature quantity y by using Equation (5) (S13). The synthesizing unit 109 calculates a high frequency component of the patch by calculating a linear sum of T high-image-quality base vectors multiplied by the coefficients included in the sparse solution of the coefficient matrix and synthesizes the calculated high frequency component and a low frequency component calculated in S11 (S14). By processes S11 through S14, the image quality enhancing apparatus 1 generates an image with the enhanced image quality.

As described in detail above, in the present embodiment, the image quality enhancing apparatus 1 calculates the coefficients of low-image-quality base vectors which express a feature quantity with a linear sum from the feature quantity of an image and generates an image with the image quality enhanced by using the calculated coefficients to calculate the linear sum of high-image-quality base vectors. The image quality enhancing apparatus 1 selects a predetermined number of base vectors that are highly influential on the feature quantity from among a plurality of base vectors when calculating a coefficient, and calculates the solution of a coefficient matrix with the coefficient of the base vectors other than the selected base vectors as zero. By calculating the solution of the coefficient matrix such that the sum of squares of the coefficients are as small as possible and the difference between the linear sum of the base vectors and the feature quantity is as small as possible, a solution close to a sparse solution is obtained. Since the selected base vectors are the base vectors that are highly influential on the feature quantity, it is possible to nearly express the feature quantity with a linear sum of the selected base vectors. For this reason, by calculating the solution of the coefficient matrix after limiting the base vectors with non-zero coefficients to fewer base vectors that are highly influential on the feature quantity, a sparse solution which made the coefficients other than the coefficients of the fewer base vectors zero can be obtained. In this manner, in the present embodiment, the sparse solution of the coefficient matrix for expressing the feature quantity of the image with the linear sum of a plurality of base vectors can be obtained without using the iteration method. Even when noise is included in the image, the sparse solution of the coefficient matrix hardly changes, and the image quality enhancing apparatus 1 can perform the image quality enhancement of the image stably.

In the present embodiment, a coefficient matrix is calculated after limiting the base vectors with non-zero coefficients to fewer base vectors. Thus, the number of the base vectors used for calculation decreases and the processing amount necessary for the calculation of the coefficient matrix decreases. Also, since a sparse solution of the coefficient matrix can be calculated without using the iteration method, the processing duration necessary for the calculation of the coefficient matrix is shortened compared to the case where the iteration method is used. For this reason, the delay of the process by image quality enhancement of the image decreases even when a real-time performance is required such as when displaying an image on an image display apparatus. Also, the cost of the circuits of the image quality enhancing apparatus 1 is held down due to the reduction in the necessary processing amount and the shortening of the processing duration. Therefore, a learning-type image quality enhancing method utilizing sparse expression becomes sufficiently practical so that a practical image quality enhancing apparatus 1 can be realized.

(Embodiment 2)

In Embodiment 2, an embodiment where the number of base vectors which express the feature quantity of an image with a linear sum is adjusted is shown. In Embodiment 1, the number of the base vectors with non-zero coefficients, T, is regarded as a constant value. In a method to solve a conditional equation of Equation (1) by the iteration method described in Non-Patent Document 1, the number of the base vectors with non-zero coefficients varies according to the position of the patch in an image. Specifically, the number of the base vectors increases in a portion of an edge in the image. Therefore, in the portions other than the edge portion, it is possible to decrease the number of base vectors. Also, when there is a lot of noise in the image, the larger the number of the base vectors, the easier it becomes for the linear sum of the base vectors to express the noise and the easier it becomes for the noise to reappear also in an image with the image quantity enhanced. Therefore, for an image with a lot of noise, it is desirable to decrease the number of the base vectors with non-zero coefficients.

Figure 7:
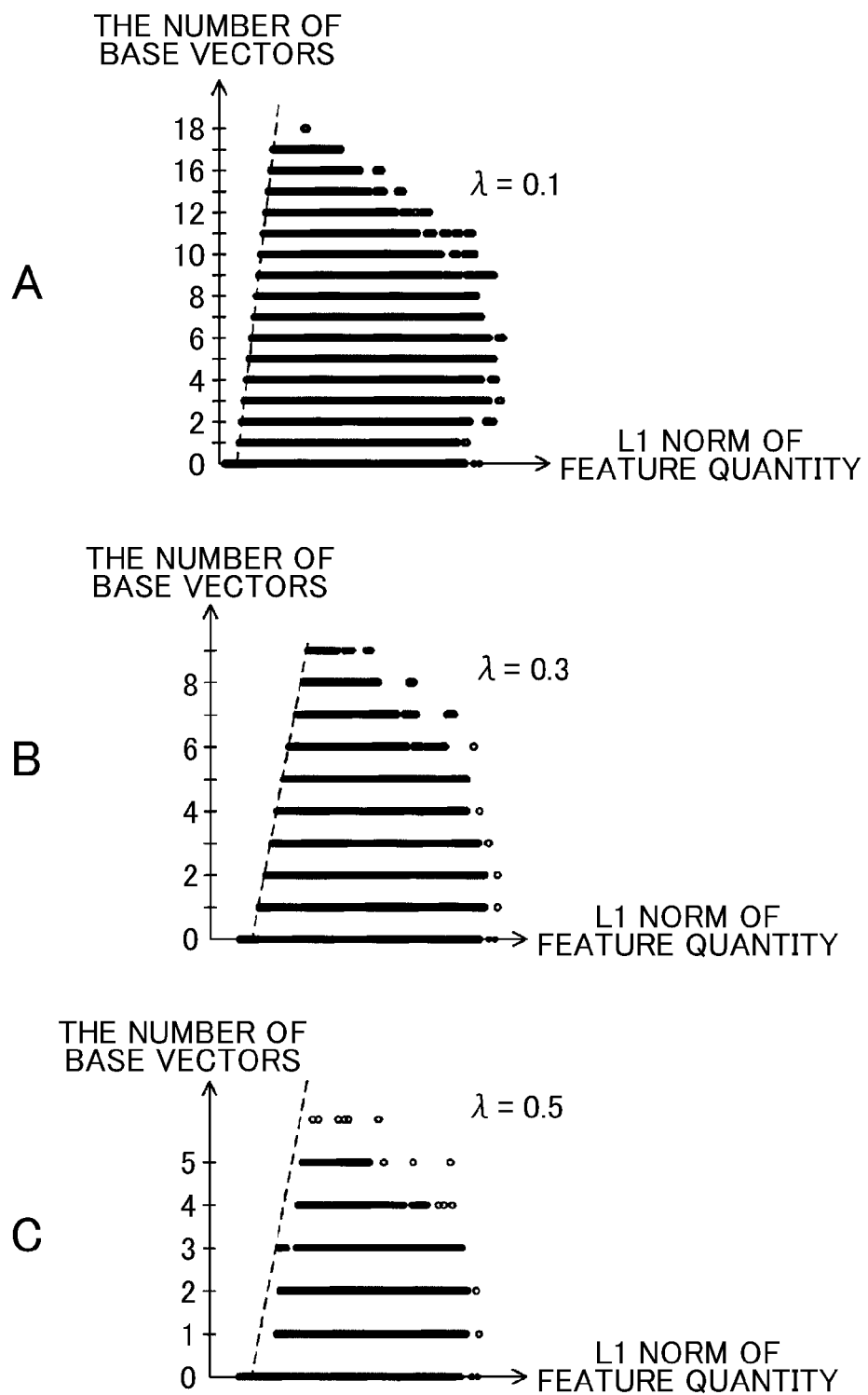
FIG. 7 is a characteristic diagram showing the relationship between the feature quantity of the image and the number of the base vectors expressed with the linear sum of the feature quantity.

FIG. 7 is a characteristic diagram showing the relationship between the feature quantity of an image and the number of the base vectors expressing the feature quantity with a linear sum. The relationship between the number of the base vectors actually obtained by the method of solving a conditional equation of Equation (1) by the iteration method described in Non-Patent Document 1 and L1 norm of the feature quantity in each patch in the image is shown. The L1 norm of the feature quantity is the sum of the absolute values of the vector components of the feature quantity y. The horizontal axis in the figure indicates the L1 norm of the feature quantity, and the longitudinal axis indicates the number of the base vectors. Also, in FIG. 7A, the relationship between the L1 norm of the feature quantity and the number of the base vectors is shown for the case where the parameter $\lambda=0.1$. The relationship for the case where $\lambda=0.3$ is shown in FIG. 7B, and the relationship for the case where $\lambda=0.5$ is shown in FIG. 7C. For any value of $\lambda$, the smaller the L1 norm of the feature quantity, the smaller the maximum number of base vectors tends to become. In FIG. 7, the straight line indicating the relationship between the L1 norm of the feature quantity and the maximum number of the base vectors is shown by a dashed line. The feature quantity can be sufficiently expressed with a linear sum of the base vectors by letting the maximum number of the base vectors corresponding to the L1 norm of the feature quantity be the number of the base vectors T which express the feature quantity with a linear sum.

Figure 8:
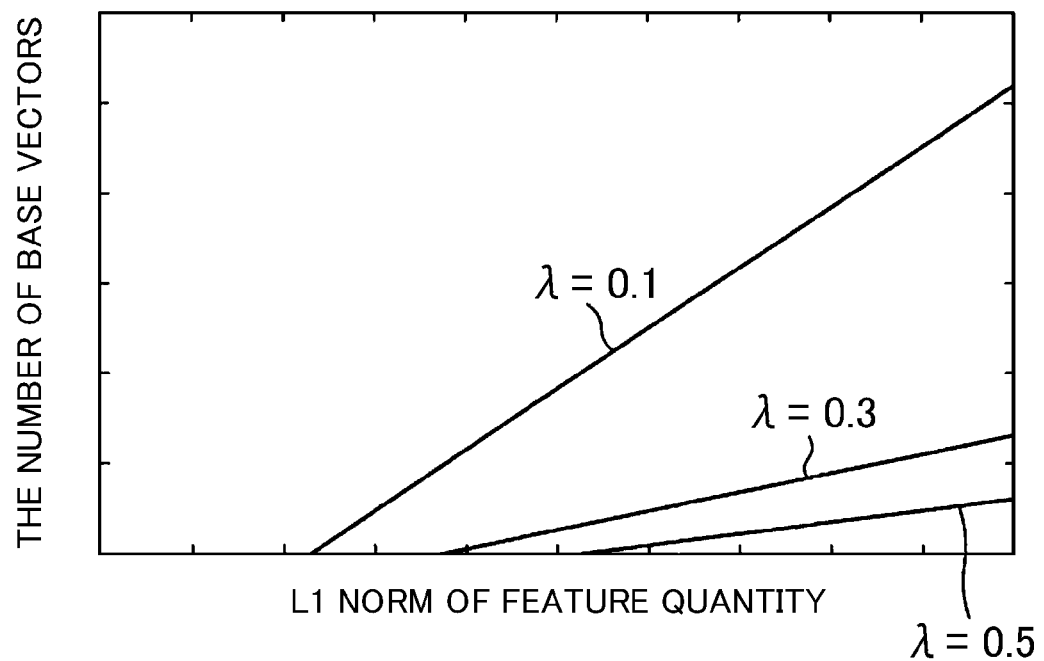
FIG. 8 is a characteristic diagram showing the relationship between the L1 norm of the feature quantity and the maximum number of the base vectors.

FIG. 8 is a characteristic diagram showing the relationship between the L1 norm of the feature quantity and a maximum number of the base vectors. In the figure, the straight line indicating the relationships between the L1 norm of the feature quantity and the maximum number of the base vectors is shown for the cases where $\lambda=0.1$, $\lambda=0.3$, and $\lambda=0.5$. The larger the $\lambda$, the smaller the maximum number of the base vectors corresponding to the L1 norm of the feature quantity becomes. Let the maximum number of the base vectors corresponding to the L1 norm of the feature quantity be the number of the base vectors which express the feature quantity with a linear sum T. As shown in FIG. 8, the relationship between the number of the base vectors T and the L1 norm of the feature quantity y, $\|y\|_1$, is in a form of a straight line and is expressed by Equation (6) below.

[Eq. 6]

$$T = a\|y\|_1 + b \tag{6}$$

The a and b in Equation (6) are constants and differ according to the value of $\lambda$. The values of a and b according to the value of $\lambda$ can be predetermined by examining the relationship between the L1 norm of the feature quantity and the maximum number of the base vectors for an actual image by the method of solving a conditional equation of Equation (1) by the iteration method described in Non-Patent Document 1. By using the values of the predetermined a and b, the number of the base vectors T corresponding to the feature quantity y of the image can be calculated from Equation (6). Actually, the calculation can be performed by Equation (7) below with T_max as a predetermined value.

[Eq. 7]

$$T=\min(T_{max},\max(a\|y\|_1+b,0)) \quad (7)$$

Equation (7) is an equation for preventing the overflow where the value of T becomes excessively large and the underflow where it becomes the value of less than zero. In a portion of the edge in the image, the value of the L1 norm of the feature quantity becomes large, and the number of the base vectors T increases. In the portions other than the edge, the value of the L1 norm of the feature quantity becomes small, and the number of the base vectors T can be decreased. Also, if there is a lot of noise in the image and it is desirable to reduce the number of the base vectors T, the values of a and b according to the with a larger value should be used.

Figure 9:
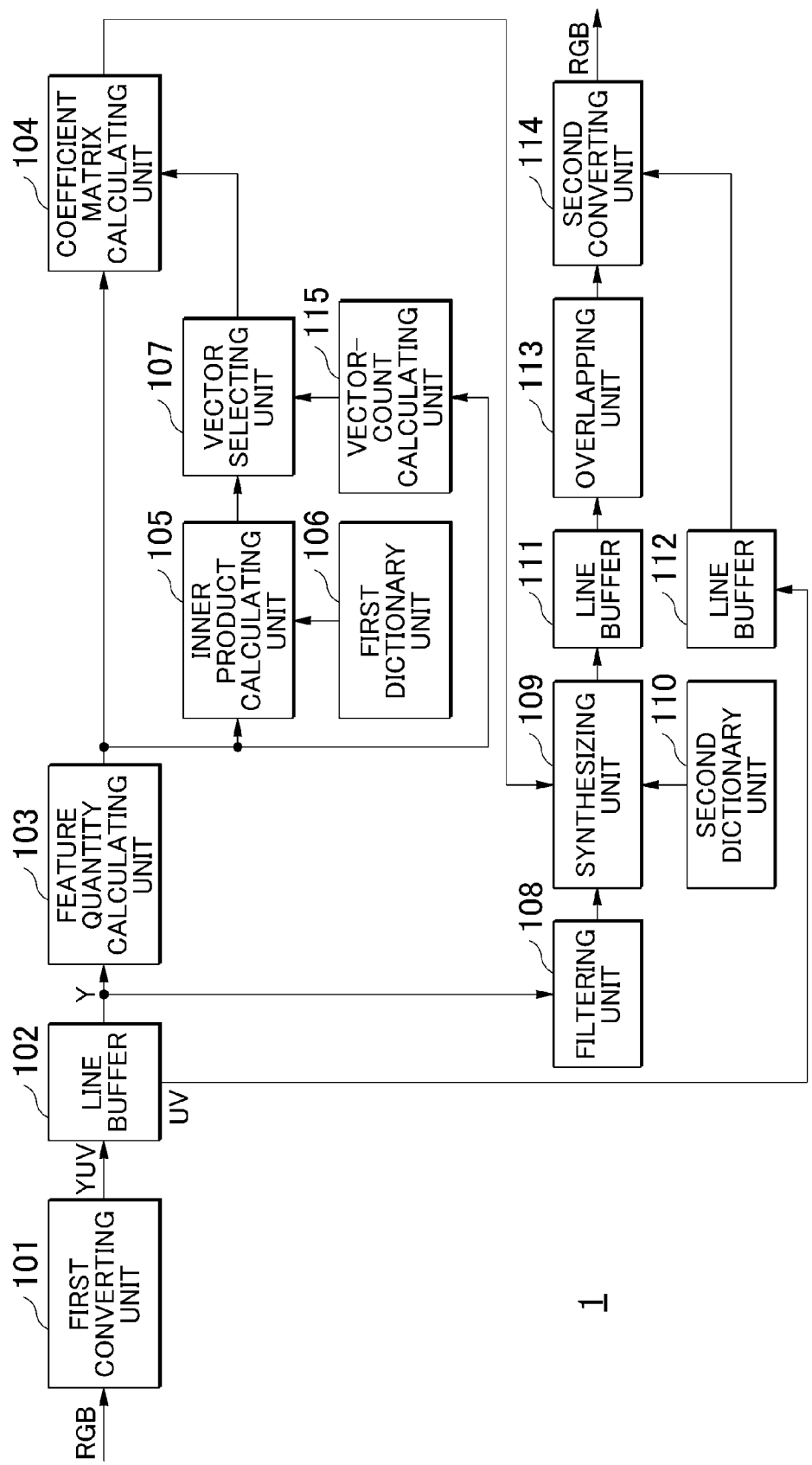
FIG. 9 is a block diagram showing the configuration of internal functions of the image quality enhancing apparatus according to Embodiment 2.

The configuration of the image display apparatus according to Embodiment 2 is similar to that of Embodiment 1. FIG. 9 is a block diagram showing the configuration of internal functions of the image quality enhancing apparatus 1 according to Embodiment 2. A vector-count calculating unit 115 is connected to the feature quantity calculating unit 103, and a vector selecting unit 107 is connected to the vector-count calculating unit 115. The vector-count calculating unit 115 calculates the number of the base vectors T selected by the vector selecting unit 107. The vector-count calculating unit 115 stores the values of a and b that are predetermined according to the value of λ.

The control unit 2 of an image display apparatus inputs the value of λ into the image quality enhancing apparatus 1. For example, a control signal indicating the amplitude of the noise included in an image which the image display apparatus is to display is input into the input unit 3, and the control unit 2 inputs the value of λ according to the amplitude of the noise indicated by the control signal into the image quality enhancing apparatus 1. The control unit 2 determines the value of λ such that it increases as the amplitude of the noise becomes larger, and inputs the determined value of λ into the image quality enhancing apparatus 1. Also, for example, the control unit 2 calculates the amplitude of the noise based on an image signal that has been input into the input unit 3, and inputs the value of λ according to the amplitude of the calculated noise into the image quality enhancing apparatus 1. Also, for example, the control signal which designated the value of λ by an operation of a user, etc. is input into the input unit 3, and the control unit 2 inputs the value of λ indicated by the control signal into the image quality enhancing apparatus 1.

The feature quantity calculating unit 103 inputs the vectors of the feature quantity y calculated into the vector-count calculating unit 115. Also, the value of λ from the control unit 2 is input into the vector-count calculating unit 115. The vector-count calculating unit 115 reads out the values of a and b stored corresponding to the value of λ the which has been input, calculates the L1 norm $\|y\|_1$ of the feature quantity y from the feature quantity y which has been input, and calculates the number of the base vectors T by using Equation (7). The vector-count calculating unit 115 inputs the calculated number of the base vectors T into the vector selecting unit 107. The vector selecting unit 107 selects, among the n base vectors, T base vectors which have been input in descending order of the values of the inner products of the vectors of the feature quantity y. The other configurations and processes of the image quality enhancing apparatus 1 are similar to those of Embodiment 1.

The vector-count calculating unit 115 may be in a form that the values of a and b are fixed to one type. In this embodiment, the image quality enhancing apparatus 1 performs the process in which the value of λ is fixed. Also, the image quality enhancing apparatus 1 may be in a form of performing the process according to the amplitude of the noise included in a patch of an image without the value of λ input from the control unit 2. In this embodiment, the vector-count calculating unit 115 calculates a noise standard deviation of the patch from the feature quantity y of the patch which has been input from the feature quantity calculating unit 103 by a predetermined noise estimation method. The vector-count calculating unit 115 associates the value of the noise standard deviation with the predetermined values of a and b and store them. The values a and b are defined such that the larger the value of the noise standard deviation, the smaller the number of the base vectors T becomes. The vector-count calculating unit 115 reads out the values of a and b associated with the calculated noise standard deviation and calculates the number of the base vectors T by using Equation (7). In this embodiment, the image quality enhancing apparatus 1 can adjust the number of the base vectors T according to the noise of each patch included in the image.

Figure 10:
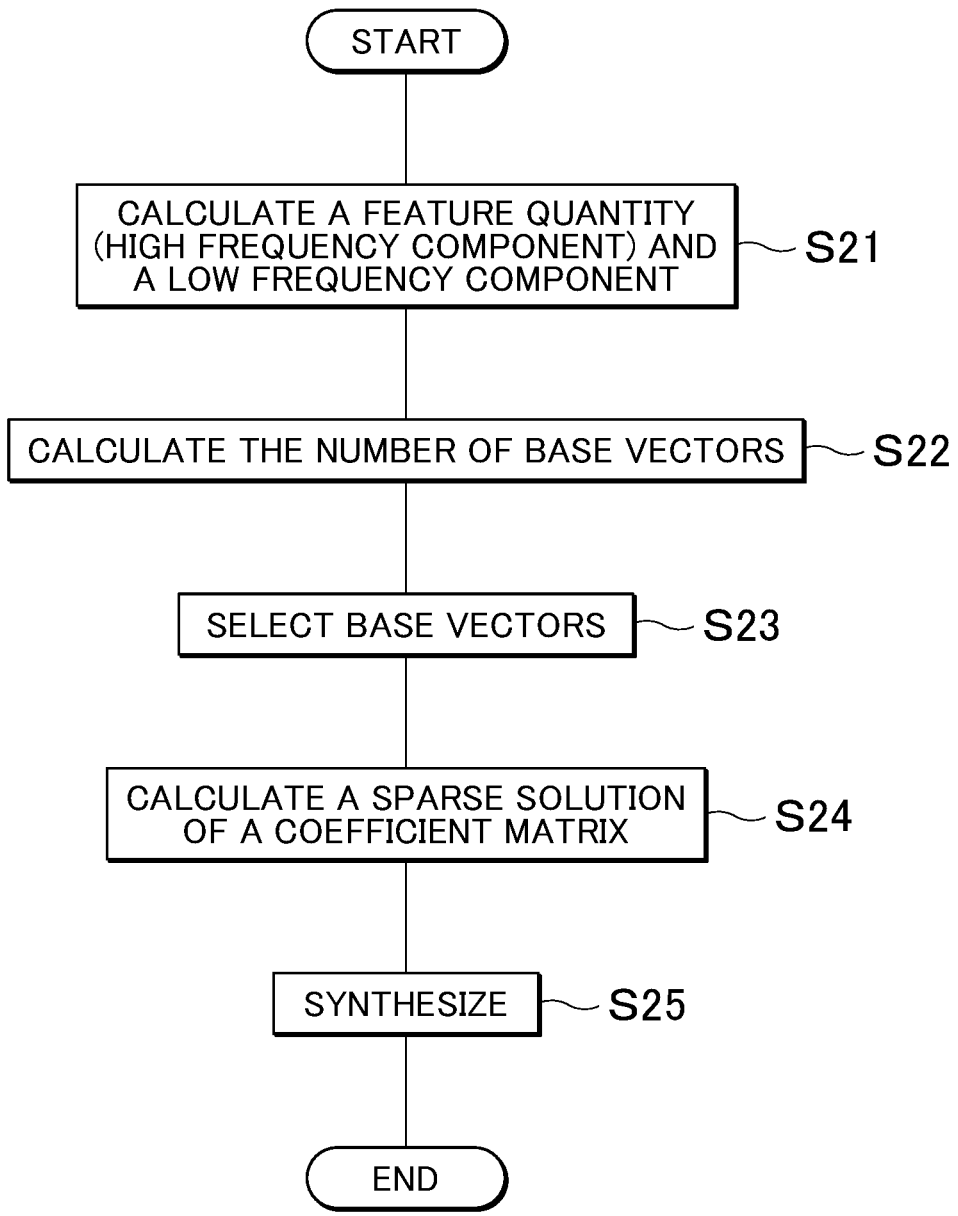
FIG. 10 is a flowchart showing the procedure of an image quality enhancement process executed by the image quality enhancing apparatus according to Embodiment 2.

FIG. 10 is a flowchart showing the procedure of the image quality enhancement process executed by the image quality enhancing apparatus 1 according to Embodiment 2. The feature quantity calculating unit 103 calculates the feature quantity that is a high frequency component of the luminance of the patch, and the filtering unit 108 calculates a low frequency component of the luminance of the patch (S21). The vector-count calculating unit 115 calculates the number of the base vectors T which expresses the feature quantity y of the patch with a linear sum by using Equation (7) (S22). The inner product calculating unit 105 and vector selecting unit 107 select the T base vectors that are highly influential on the feature quantity from among the n low-image-quality base vectors (S23). The coefficient matrix calculating unit 104 calculates a sparse solution x of the coefficient matrix α from the selected T base vectors and the feature quantity y by using Equation (5) (S24). By using the coefficients included in the solution x to calculate the linear sum of T high-image-quality base vectors, the synthesizing unit 109 calculates a high frequency component of the patch and synthesizes the calculated high frequency component and low frequency component (S25). By the processes S21 through S25, the image quality enhancing apparatus 1 generates an image with the enhanced image quality.

As described in detail above, in the present embodiment, the image quality enhancing apparatus adjusts the selected number of the base vectors to calculate a sparse solution of the coefficient matrix according to the situation. For a patch of which the absolute value of the feature quantity is small and does not include an edge, the solution of the coefficient matrix that is sparser can be obtained by reducing the selected number of base vectors. Also, for a patch of which the absolute value of the feature quantity is large and includes an edge, the image quality enhancement can be performed on the image without attenuating the edge by increasing the selected number of the base vectors. Also, in the present embodiment, the image quality enhancing apparatus 1 can adjust the selected number of the base vectors to calculate a sparse solution of the coefficient matrix according to the amount of noise. By reducing the number of the base vectors that are selected when the amount of noise is large, the solution of the coefficient matrix that is less susceptible to the influence of the noise and is sparser can be obtained, and it becomes possible to perform the image quality enhancement of an image by eliminating the influence of the noise.

(Embodiment 3)

Figure 11:
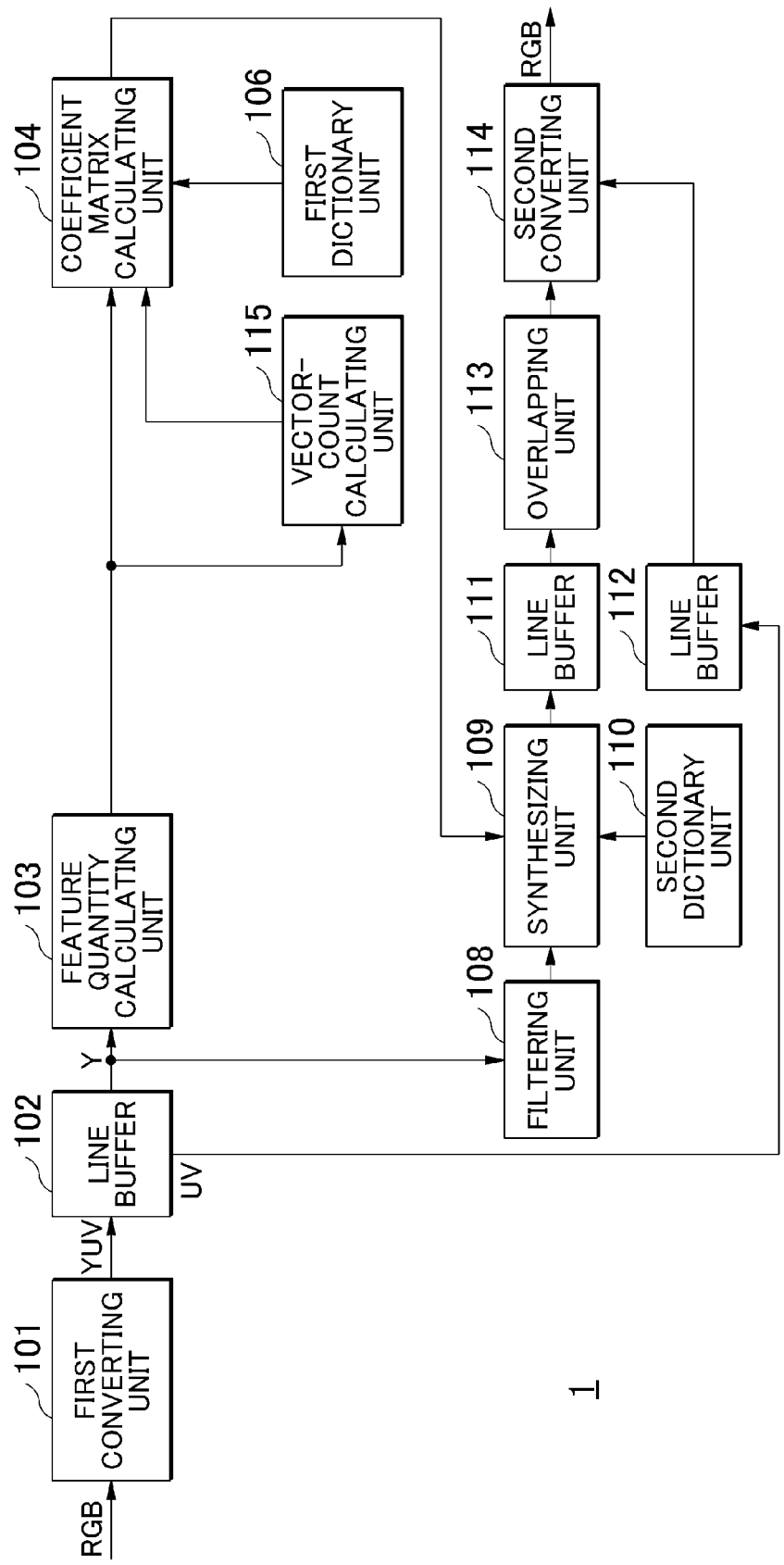
FIG. 11 is a block diagram showing the configuration of internal functions of the image quality enhancing apparatus according to Embodiment 3.

The configuration of the image display apparatus according to Embodiment 3 is similar to that of Embodiment 2. FIG. 11 is a block diagram showing the configuration of internal functions of the image quality enhancing apparatus 1 according to Embodiment 3. The image quality enhancing apparatus 1 does not comprise the inner product calculating unit 105 and the vector selecting unit 107, the vector-count calculating unit 115 is connected to the coefficient matrix calculating unit 104, and the first dictionary unit 106 is connected to the coefficient matrix calculating unit 104.

The vector-count calculating unit 115 calculates the number of the base vectors T with non-zero coefficients by a method similar to that of Embodiment 2. Namely, the vector-count calculating unit 115 calculates the number of the base vectors T based on the value of $\lambda$ which has been input from the control unit 2 or the noise standard deviation of the patch. The vector-count calculating unit 115 inputs the calculated number of the base vectors T into the coefficient matrix calculating unit 104. The coefficient matrix calculating unit 104 calculates a sparse solution of the coefficient matrix by the iteration method. Specifically, the coefficient matrix calculating unit 104 defines the number of the base vectors T input from the vector-count calculating unit 115 to be an initial value of the number of the non-zero coefficients included in the coefficient matrix, and solves a conditional equation of Equation (1) by the iteration method described in Non-Patent Document 1. The other configurations and processes of the image quality enhancing apparatus 1 are similar to those of Embodiment 1.

As above, in the present embodiment, an initial value of the number of the non-zero coefficients included in the coefficient matrix is defined based on the value of $\lambda$ or the noise standard deviation of the patch, and a sparse solution of the coefficient matrix is calculated by the iteration method. The number of the base vectors which express the feature quantity of an image with a linear sum can be adjusted according to the amplitude of the noise. Also, the number of processing times to calculate the coefficient matrix by the iteration method can be reduced by limiting the initial value of the number of the non-zero coefficients included in the coefficient matrix. Practicality of the image quality enhancement improves even if the iteration method is used, because the processing duration decreases, and even when a real-time performance is required, a delay of process decreases.

(Embodiment 4)

In Embodiment 4, an embodiment where an image is adjusted when the number of the base vectors which express the feature quantity of the image with a linear sum is zero is shown. In Embodiment 2, the number of the base vectors with non-zero coefficients, T, is adjusted, and the number of the base vectors T is sometimes zero. In this case, the linear sum of the high-image-quality base vectors becomes zero, so the high frequency component of the luminance of the high image quality is zero and the patch of the high image quality consists of the low frequency component which does not include the high frequency component of the luminance. The low frequency component of the luminance is a DC component and all of the luminance values in the patch are expressed with an average luminance value of the patch. When an edge or a texture is included in the patch, the edge or the texture disappears and the image quality degrades since the patch consists of the DC component of the luminance. In the present embodiment, in order to solve this problem, an image is adjusted to preserve the edge when the number of the base vectors with non-zero coefficients is zero.

Figure 12:
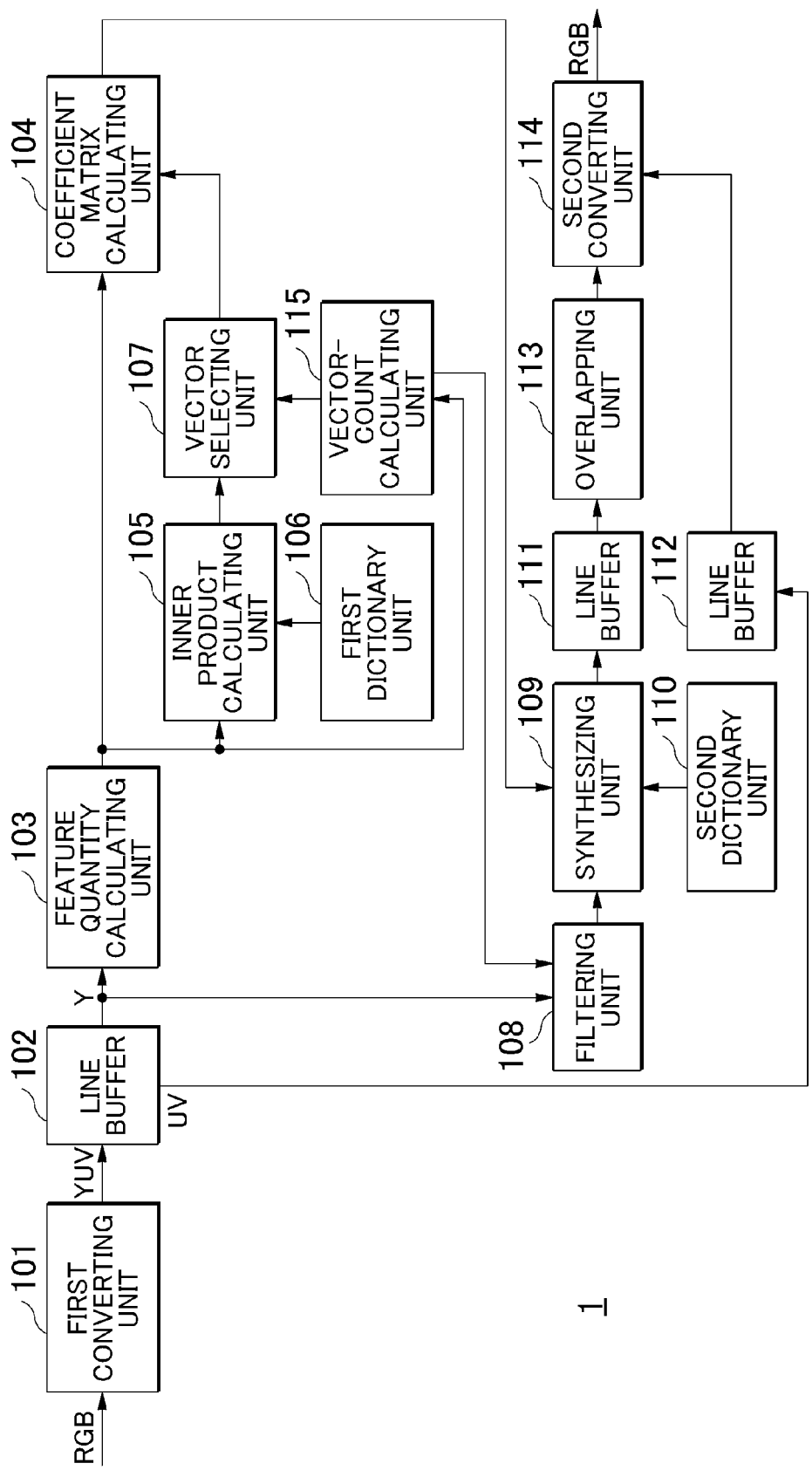
FIG. 12 is a block diagram showing the configuration of internal functions of the image quality enhancing apparatus according to Embodiment 4.

The configuration of the image display apparatus according to Embodiment 4 is similar to that of Embodiment 2. FIG. 12 is a block diagram showing the configuration of internal functions of the image quality enhancing apparatus 1 according to Embodiment 4. The filtering unit 108 is connected to the vector-count calculating unit 115. The vector-count calculating unit 115 inputs the calculated number of the base vectors T into the filtering unit 108. The filtering unit 108 judges whether or not the value of the number of the base vectors T which has been input is zero. When the value of the number of the base vectors T is not zero, the filtering unit 108 calculates a low frequency component of the luminance distribution in the patch from the luminance signal of the patch which has been input from the line buffer 102 and inputs the calculated low frequency component into the synthesizing unit 109, as with Embodiment 1. The synthesizing unit 109 calculates a high frequency component of the luminance of the patch and synthesizes the calculated high frequency component of the luminance and the low frequency component, as with Embodiment 1. When the value of the number of the base vectors T is zero, the filtering unit 108 performs a noise removal process by an edge-preservation filter for the input luminance signal of the patch and inputs the luminance signal after the noise removal process into the synthesizing unit 109. The synthesizing unit 109 inputs the luminance signal of the patch which has been input from the filtering unit 108 into the line buffer 111. The edge-preservation filter is a filter to smoothen the luminance distribution in the patch while preserving edges. The edge-preservation filter used for calculation may be a general filter having a property of preserving an edge, and it may be, for example, a bilateral filter or a total variation filter. The other configurations and processes of the image quality enhancing apparatus 1 are similar to those of Embodiment 2.

The filtering unit 108 may be in a form that it adjusts the parameter of the edge-preservation filter according to the noise. The vector-count calculating unit 115 inputs the noise standard deviation into the filtering unit 108. The filtering unit 108 adjusts the parameter of the edge-preservation filter according to the noise standard deviation which has been input. For example, the filtering unit 108 adjusts the parameter of the edge-preservation filter so that the intensity of smoothening is increased as there is more noise. Thereby, the noise can be removed effectively while preserving the edge in the patch as well.

Figure 13:
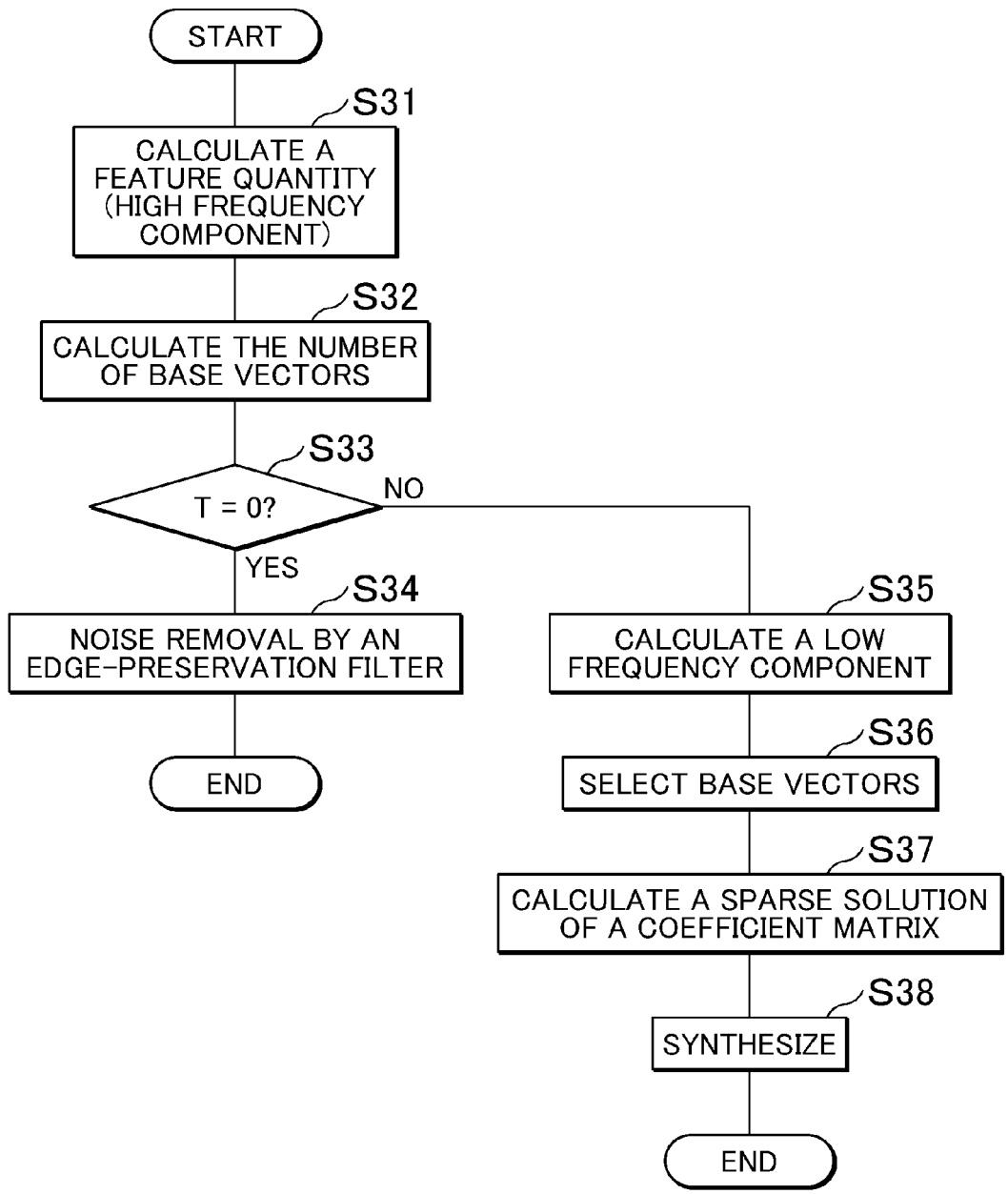
FIG. 13 is a flowchart showing the procedure of the image quality enhancement process executed by the image quality enhancing apparatus according to Embodiment 4.

FIG. 13 is a flowchart showing the procedure of the image quality enhancement process executed by the image quality enhancing apparatus 1 according to Embodiment 4. The feature quantity calculating unit 103 calculates the feature quantity that is a high frequency component of the luminance of the patch (S31). The vector-count calculating unit 115 calculates the number of the base vectors T expressing the feature quantity y of the patch with a linear sum (S32). When the number of the base vectors T is zero (S 33: YES), the filtering unit 108 performs the noise removal by the edge-preservation filter on the luminance signal of the patch (S34). In this manner, the image quality enhancing apparatus 1 generates an image with the image quality enhanced. When the number of the base vectors T is not zero (S33:

NO), the filtering unit 108 calculates a low frequency component of the luminance of the patch (S35). The low frequency component is, for example, a DC component. The inner product calculating unit 105 and the vector selecting unit 107 select T base vectors which are highly influential on the feature quantity from among n low-image-quality base vectors (S36). The coefficient matrix calculating unit 104 calculates a sparse solution x of the coefficient matrix α from the selected T base vectors and the feature quantity y (S37). The image quality enhancing apparatus 1 executes the process of S35 and the processes of S36 and S37 in parallel. The image quality enhancing apparatus 1 may be in a form that it sequentially executes the processes of S35 to S37. The synthesizing unit 109 calculates a high frequency component of the luminance of the patch by using the coefficient included in the solution x and synthesizes the calculated high frequency component and low frequency component (S38). In this manner, the image quality enhancing apparatus 1 generates an image with the image quality enhanced.

As above, in the present embodiment, the image quality enhancing apparatus 1 adjusts an image by performing the noise removal by the edge-preservation filter when the number of the base vectors which express the feature quantity of the image with a linear sum is zero. Even if the number of the base vectors is zero, the degradation of the image quality where an edge or texture in the image disappears does not occur.

(Embodiment 5)

Figure 14:
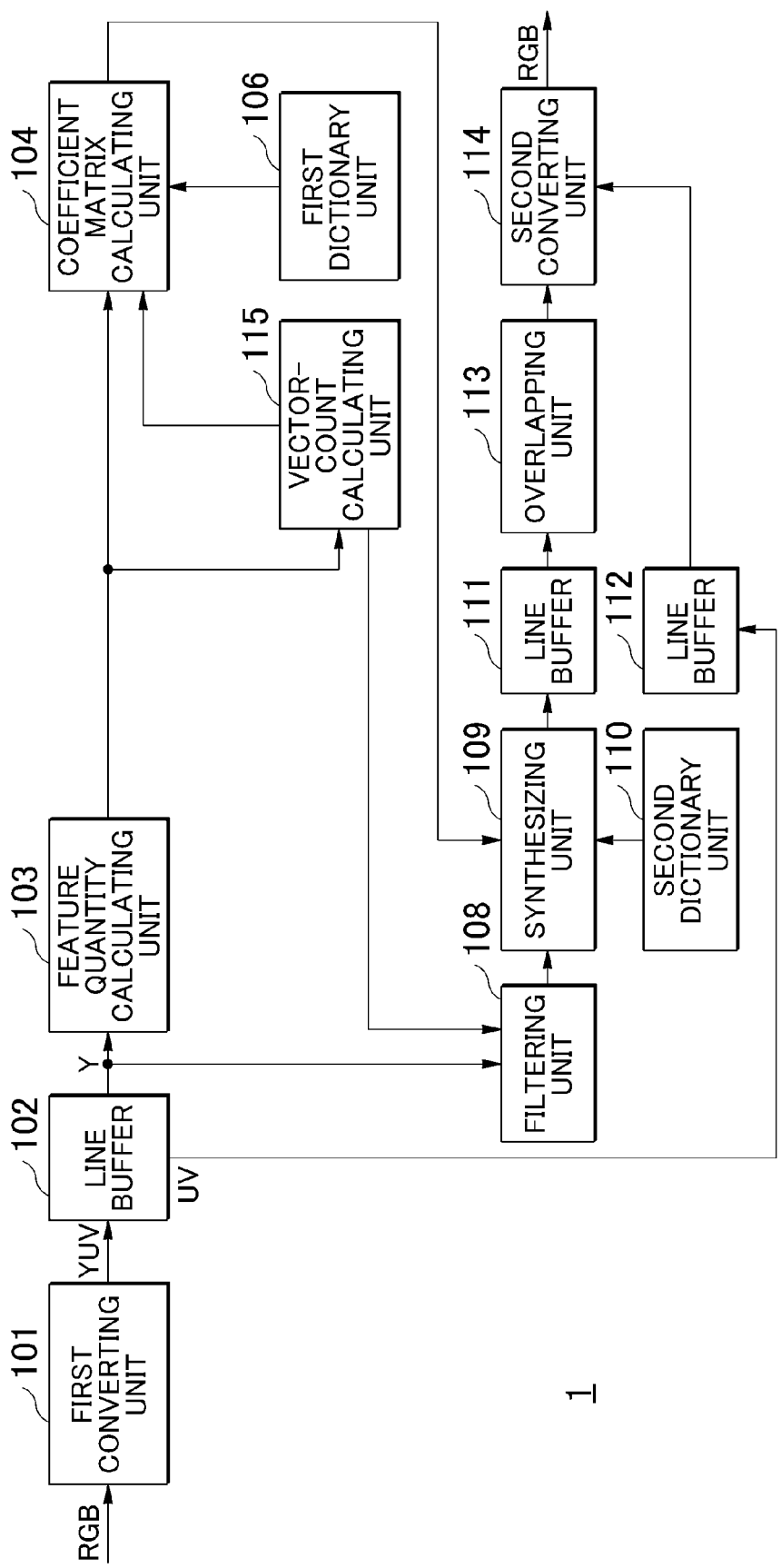
FIG. 14 is a block diagram showing the configuration of internal functions of the image quality enhancing apparatus according to Embodiment 5.

The configuration of the image display apparatus according to Embodiment 5 is similar to that of Embodiment 3. FIG. 14 is a block diagram showing the configuration of internal functions of the image quality enhancing apparatus 1 according to Embodiment 5. The image quality enhancing apparatus 1 does not comprise the inner product calculating unit 105 and the vector selecting unit 107, the vector-count calculating unit 115 is connected to the coefficient matrix calculating unit 104, and the first dictionary unit 106 is connected to the coefficient matrix calculating unit 104. The filtering unit 108 is connected to the vector-count calculating unit 115.

The vector-count calculating unit 115 inputs the calculated number of the base vectors T into the coefficient matrix calculating unit 104 and the filtering unit 108. The filtering unit 108 judges whether or not the value of the number of the base vectors T which has been input is zero and calculates a low frequency component of the luminance distribution in the patch and inputs the calculated low frequency component into the synthesizing unit 109 when the value of the number of the base vectors T is not zero, as with Embodiment 4. The coefficient matrix calculating unit 104 defines the number of the base vectors T which has been input from the vector-count calculating unit 115 as an initial value of the number of the non-zero coefficients included in the coefficient matrix and calculates a sparse solution of the coefficient matrix by the iteration method, as with Embodiment 3. The synthesizing unit 109 calculates the high frequency component of the luminance of the patch from the solution of the coefficient matrix and synthesizes the high frequency component and the low frequency component of the luminance. When the value of the number of the base vectors T is zero, the filtering unit 108 performs the noise removal process by the edge-preservation filter for the luminance signal of the patch which has been input and inputs the luminance signal after the noise removal process into the synthesizing unit 109, as with Embodiment 4. The synthesizing unit 109 inputs the luminance signal of the patch which has been input into the line buffer 111. The other configuration and processes of the image quality enhancing apparatus 1 are similar to those of Embodiment 3.

As above, in the present embodiment, the image quality enhancing apparatus 1 defines the initial value of the number of the non-zero coefficients included in the coefficient matrix, and it calculates the sparse solution of the coefficient matrix by the iteration method when the initial value is not zero, and it adjusts the image by performing the noise removal by the edge-preservation filter when the initial value is zero. In the embodiment of calculating the coefficient matrix by the iteration method, the degradation of the image quality where an edge or texture in the image disappears does not occur even when the number of the base vectors which express the feature quantity of the image with a linear sum is zero.

(Embodiment 6)

In Embodiment 6, an embodiment in which the feature quantity of a patch is adjusted in units of pixels according to the noise is shown. In Embodiment 2, the intensity of the noise removal is adjusted by adjusting the number of the base vectors which express the feature quantity of the patch with a linear sum according to the noise. When an edge and noise are mixed in a single patch and the intensity of the noise removal is adjusted in units of patches, the noise may stay with the edge, or the edge may attenuate while the noise is removed. In the present embodiment, the noise is removed in units of pixels by adjusting the feature quantity of the patch that is a high frequency component of the luminance in units of pixels.

In the present embodiment, the value of the feature quantity at each pixel is attenuated, and the noise is removed by increasing the attenuation for the pixels in which noise is included and decreasing the attenuation for the pixels in which noise is not included. Whether or not noise is included in a pixel can be estimated from the size of the high frequency component of the luminance. It is assumed that the feature quantity is attenuated by multiplying the feature quantity y that is a high frequency component of the luminance at each pixel by an amplification factor $\zeta(0\le\zeta\le1)$. The noise with a smaller intensity occurs more frequently if the intensity of the noise follows the Gaussian distribution. For this reason, the smaller the absolute value of a high frequency component of the luminance, the higher the probability that the high frequency component is due to the noise, and the larger the absolute value of the high frequency component of the luminance, the higher the probability that the high frequency component is due to something other than the noise such as an edge. It is assumed that the histogram of an absolute value f of the high frequency component of the luminance due to the noise is h(f) when the noise standard deviation of an image is the predetermined s. The histogram h(f) can be obtained for an actual image. Letting the maximum value of the histogram h(f) be max (h(f)), the amplification factor $\xi(f)$ when the noise standard deviation is s and the absolute value of the high frequency component of the luminance is f is defined by Equation (8) below.

$$\xi(f)=1-h(f)/\max(h(f)) \qquad (8)$$

Figure 15:
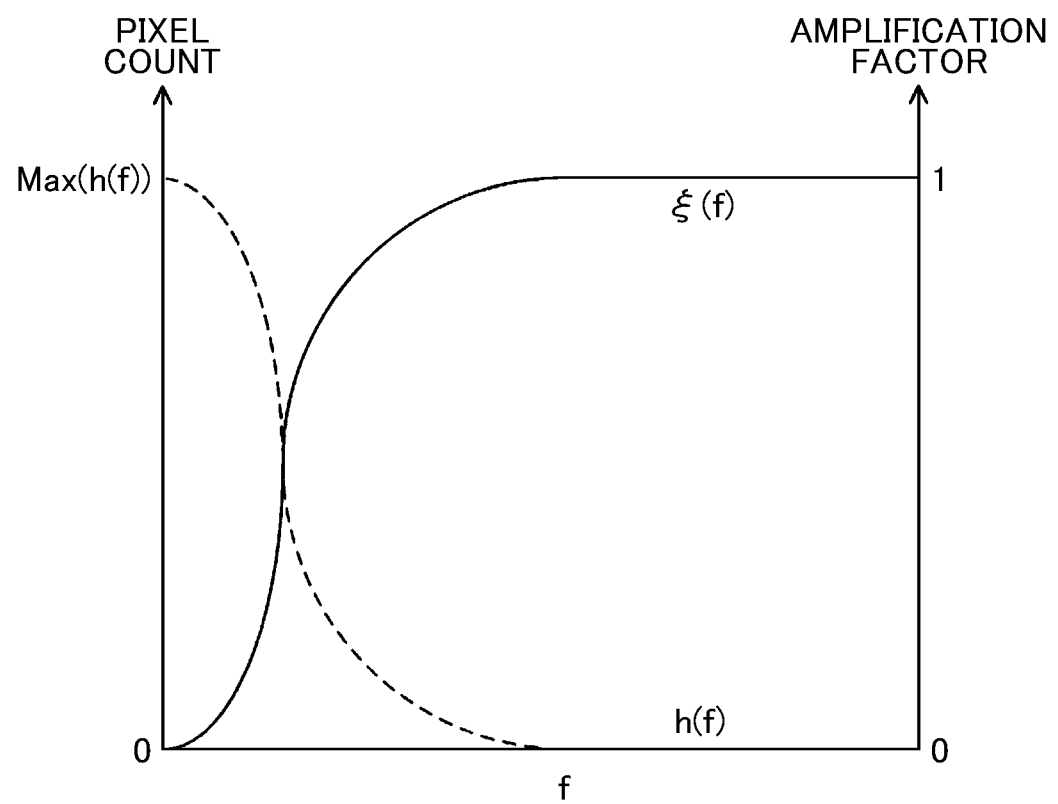
FIG. 15 is a characteristic diagram showing examples of histogram h(f) and the amplification factor $\xi(f)$.

FIG. 15 is a characteristic diagram showing the example of the histogram h(f) and the amplification factor $\xi(f)$. The horizontal axis in the figure is the absolute value f of the high frequency component of the luminance, and the longitudinal axis is the pixel count or amplification factor. In FIG. 15, an example where the noise intensity follows the Gaussian distribution. The smaller the value of f, the higher the probability that the component is the noise becomes. The attenuation of the feature quantity y can be increased and the influence of the noise can be decreased by reducing the amplification factor $\xi(f)$. Inversely, the larger the value of f, the higher the probability that the component is something other than the noise such as an edge becomes. The attenuation of the feature quantity y can be decreased and the attenuation of the edge can be prevented by increasing the amplification factor $\xi(f)$. The histogram h(f) and the amplification factor $\xi(f)$ can be predetermined Generally, the noise standard deviation of the image to be targeted for image quality enhancement is a value different from the predetermined s. It is assumed the noise standard deviation of the image to be targeted for image quality enhancement is σ and the absolute value of the feature quantity in each pixel be g. The amplification factor $\zeta$ is defined by Equation (9) below.

$$\zeta = \xi(sg/\sigma) \qquad (9)$$

Generally, the value of f in Equation (8) is an integer value. Therefore, it is necessary to perform a process to round sg/σ to an integer value when sg/σ in Equation (9) is a decimal. In this process, either a process in which the first decimal place is rounded down to integers or a process in which the first decimal place is rounded to the nearest integer may be performed. Also, a process in which $\zeta$ is calculated by performing a linear interpolation of a value that is obtained by substituting each of the two integer values nearest to sg/σ in Equation (9) may be performed.

Figure 16:
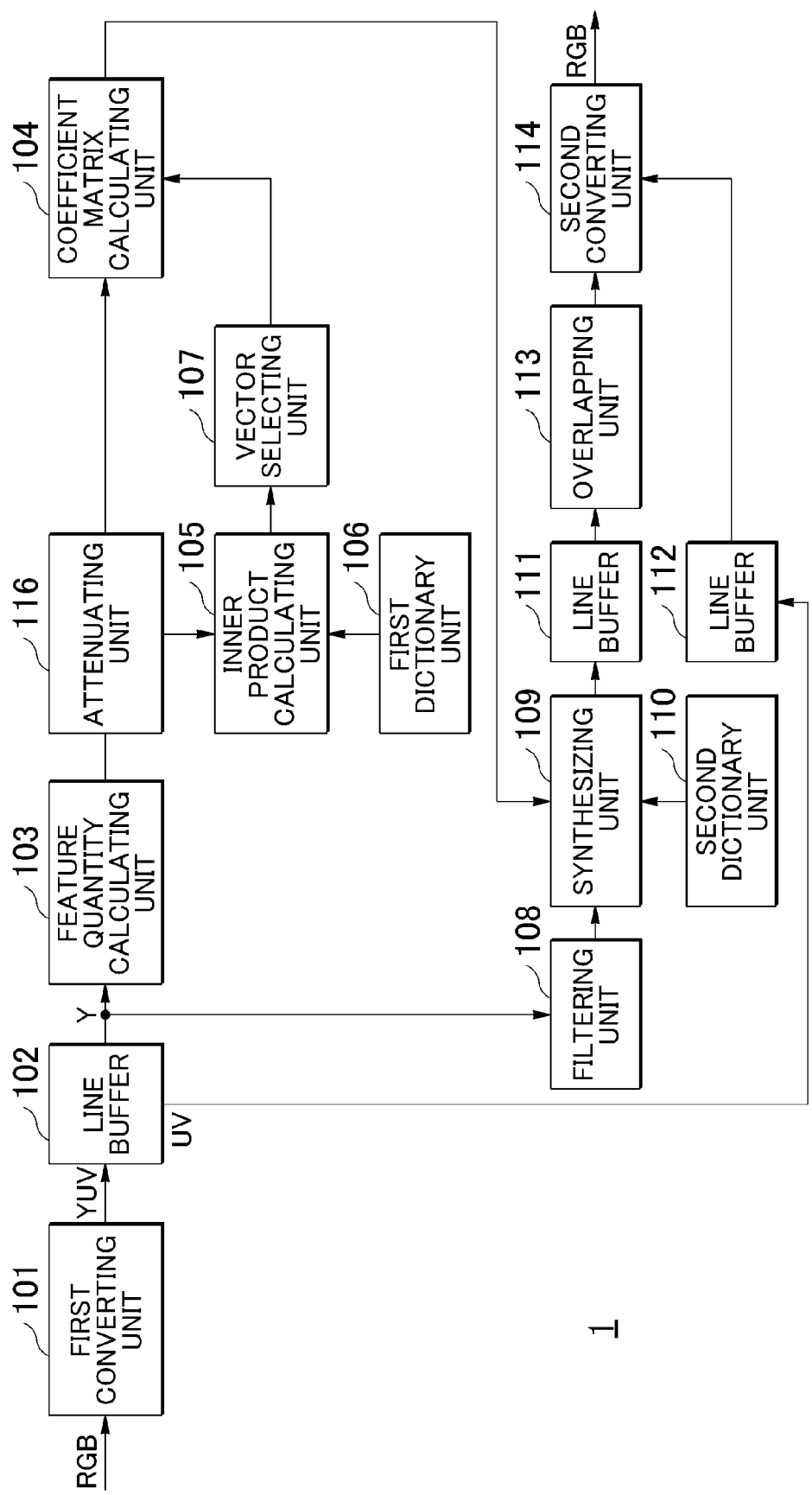
FIG. 16 is a block diagram showing the configuration of internal functions of the image quality enhancing apparatus according to Embodiment 2.

The configuration of the image display apparatus according to Embodiment 6 is similar to that of Embodiment 1. FIG. 16 is a block diagram showing the configuration of internal functions of the image quality enhancing apparatus 1 according to Embodiment 2. An attenuating unit 116 which attenuates the feature quantity of a patch is connected to the feature quantity calculating unit 103, the coefficient matrix calculating unit 104, and the inner product calculating unit 105. The attenuating unit 116 stores the predetermined noise standard deviation s in advance, and further stores in advance the predetermined histogram h(f) and Equation (8), or the value of the predetermined amplification factor $\xi(f)$. In the embodiment in which the histogram h(f) is stored, the attenuating unit 116 stores a table associating the value of f with the value of the pixel count. In the embodiment in which the value of the amplification factor $\xi(f)$ is stored, the attenuating unit 116 stores the table associating the value of f with the value of $\xi(f)$.

The feature quantity calculating unit 103 inputs the feature quantity y of the patch into the attenuating unit 116. The attenuating unit 116 calculates the noise standard deviation of the patch σ from the input feature quantity y of the patch by a predetermined noise estimation method. The attenuating unit 116 may be in a form that the noise standard deviation σ of the entire image is input into the attenuating unit 116 from the control unit 2. Next, the attenuating unit 116 extracts the value of the feature quantity in each pixel from the feature quantity y of the patch, calculates the absolute value g of the feature quantity and calculates the amplification factor $\zeta$ by using Equation (9) for each pixel included in the patch. The attenuating unit 116 then attenuates the feature quantity by multiplying the feature quantity with the amplification factor $\zeta$ for each pixel included in the patch. The attenuating unit 116 inputs the attenuated feature quantity y for each pixel into the inner product calculating unit 105 and the coefficient matrix calculating unit 104. The inner product calculating unit 105 calculates inner products of each of the n base vectors recorded in the dictionary data stored in the first dictionary unit 106 and the vectors of the feature quantity y which has been input from the attenuating unit 116. The coefficient matrix calculating unit 104 calculates a sparse solution of the coefficient matrix by using the feature quantity y which has been input from the attenuating unit 116. The other configurations and processes of the image quality enhancing apparatus 1 are similar to those of Embodiment 1.

The attenuating unit 116 may be in a form that it attenuates the feature quantity according to the noise other than Gaussian noise of which the noise intensity follows Gaussian distribution. For example, the attenuating unit 116 may be in a form that it attenuates the feature quantity according to the salt and pepper noise. In this embodiment, the attenuating unit 116 utilizes the noise density, not the noise standard deviation. The attenuating unit 116 stores in advance the predetermined noise density, and furthermore, it stores in advance the predetermined histogram h(f) and Equation (8), or the value of the predetermined amplification factor $\xi(f)$. The attenuating unit 116 calculates the noise density of the patch for each pixel, calculates the amplification factor from the calculated noise density by a predetermined method and attenuates the feature quantity by multiplying the feature quantity with the amplification factor.

Figure 17:
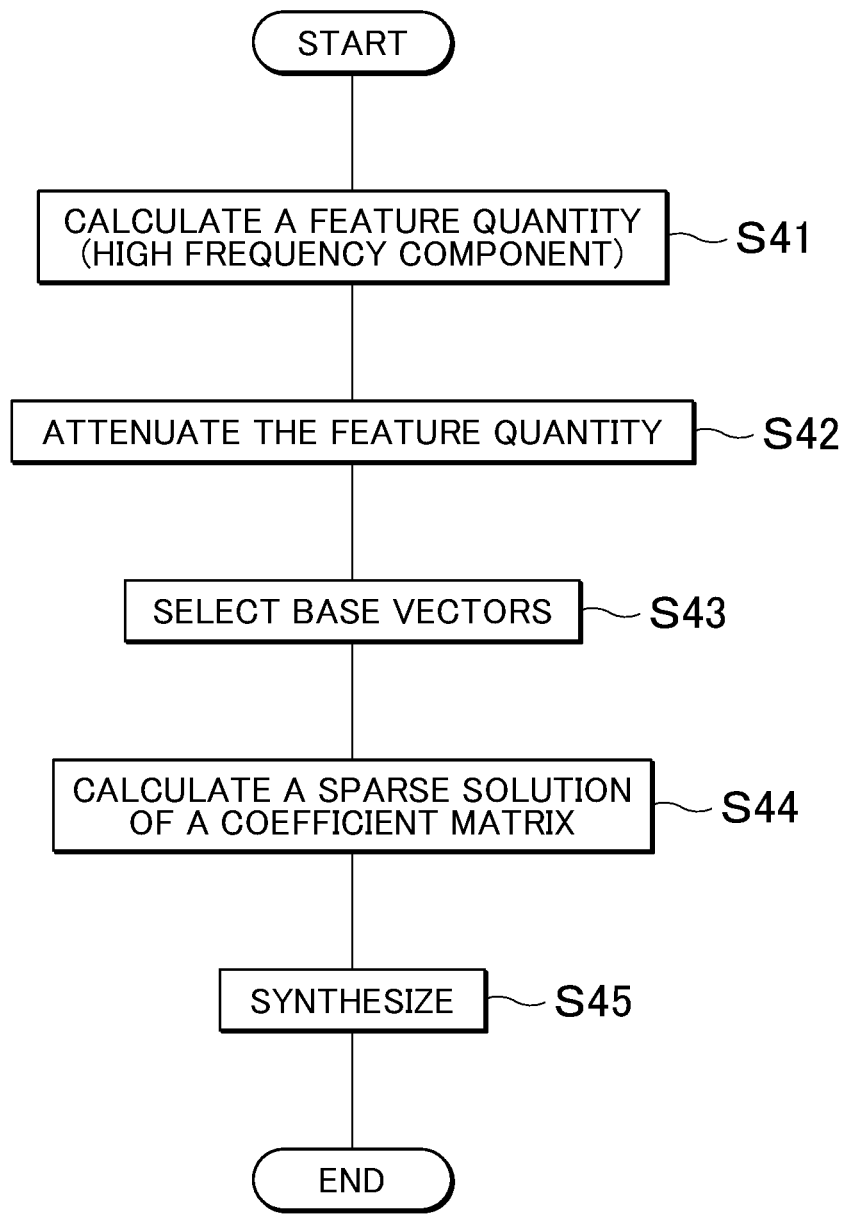
FIG. 17 is a flowchart showing the procedure of the image quality enhancement process executed by the image quality enhancing apparatus according to Embodiment 6.

FIG. 17 is a flowchart showing the procedure of the image quality enhancement process executed by the image quality enhancing apparatus 1 according to Embodiment 6. The feature quantity calculating unit 103 calculates the feature quantity that is a high frequency component of the luminance of the patch, and the filtering unit 108 calculates a low frequency component of the luminance of the patch (S41). The attenuating unit 116 attenuates the feature quantity according to the noise for each pixel (S42). The inner product calculating unit 105 and the vector selecting unit 107 select T base vectors that are highly influential on the attenuated feature quantity according to the noise from among the n low-image-quality base vectors (S43). The coefficient matrix calculating unit 104 calculates a sparse solution x of the coefficient matrix α from the selected T base vectors and the feature quantity attenuated according to the noise (S44). The synthesizing unit 109 calculates a high frequency component of the luminance of the patch by using the coefficient included in the solution x and synthesizes the calculated high frequency component and the low frequency component (S45). By the processes S41 through S45, the image quality enhancing apparatus 1 generates an image with the image quality enhanced.

As above, in the present embodiment, the image quality enhancing apparatus 1 attenuates the feature quantity in units of pixels according to the noise, and it performs the process of learning-type image quality enhancement utilizing the sparse expression based on the attenuated feature quantity. The feature quantity is greatly attenuated as the probability that the feature quantity in the pixel is noise is higher, and the influence of the noise for the solution of the coefficient matrix is reduced. Also, the attenuation of the feature quantity is decreased as the probability that the feature quantity in the pixel is something other than noise such as an edge is higher to prevent the influence of the edge on the solution of the coefficient matrix from being reduced. Since the intensity of the noise removal is adjusted in units of pixels, it becomes possible for the image quality enhancing apparatus 1 to remove the noise while preserving the edge included in the image and to significantly enhance the image quality of the image.

(Embodiment 7)

The configuration of the image display apparatus according to Embodiment 7 is similar to that of Embodiment 3.

Figure 18:
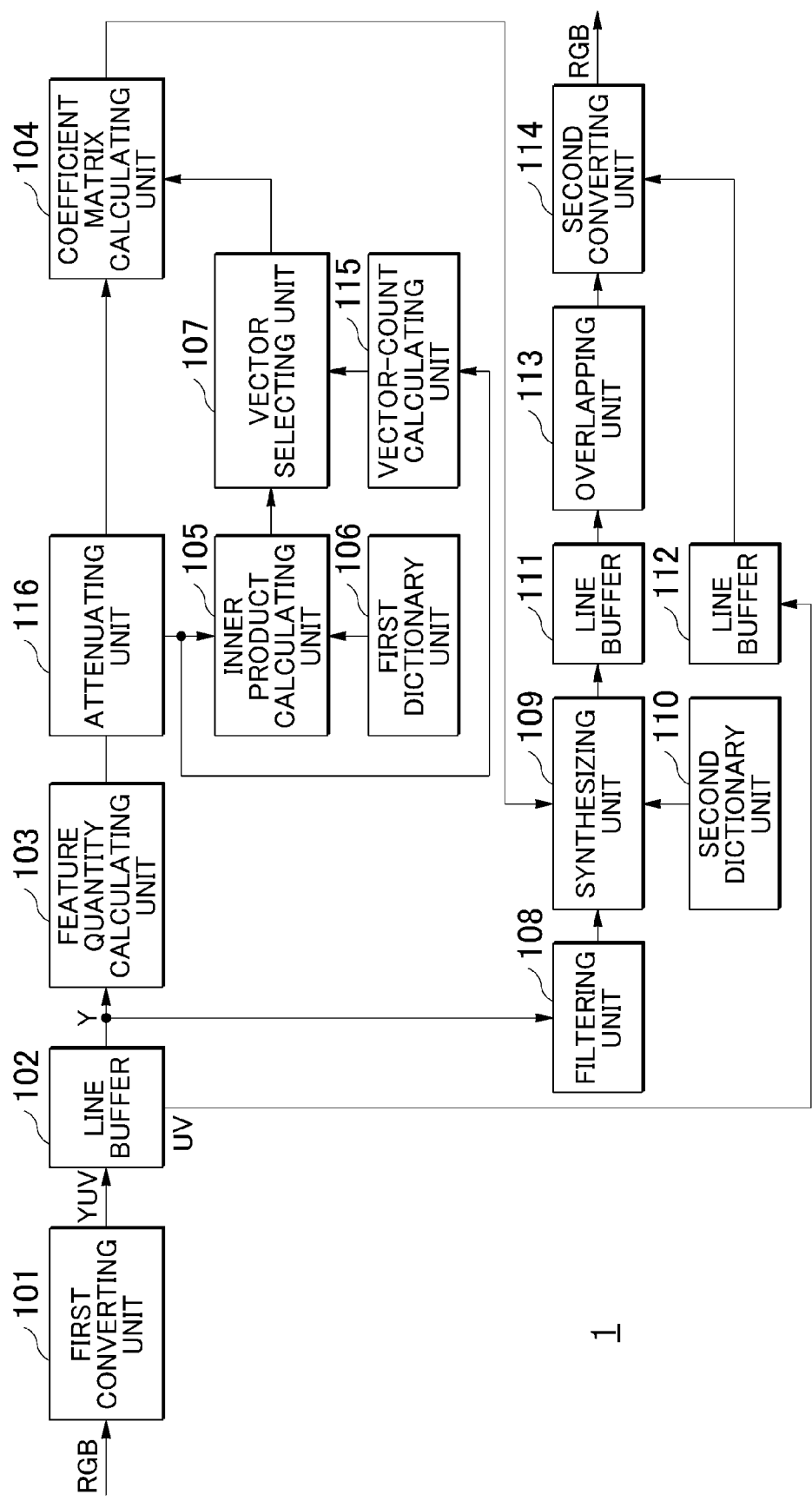
FIG. 18 is a block diagram showing the configuration of internal functions of the image quality enhancing apparatus according to Embodiment 7.

FIG. 18 is a block diagram showing the configuration of internal functions of the image quality enhancing apparatus 1 according to Embodiment 7. The attenuating unit 116 is connected to the feature quantity calculating unit 103, the coefficient matrix calculating unit 104, the inner product calculating unit 105, and the vector-count calculating unit 115. The feature quantity calculating unit 103 inputs the feature quantity y of the patch into the attenuating unit 116. The attenuating unit 116 calculates the amplification factor $\zeta$ by using Equation (9) for each pixel included in the patch and attenuates the feature quantity by multiplying the feature quantity with the amplification factor $\zeta$, as with Embodiment 6. The attenuating unit 116 inputs the feature quantity of the patch which it attenuated for each pixel into the inner product calculating unit 105, the vector-count calculating unit 115, and the coefficient matrix calculating unit 104. The inner product calculating unit 105 calculates the inner products of each of the n base vectors recorded in the dictionary data stored by the first dictionary unit 106 and the vectors of the feature quantity y which has been input from the attenuating unit 116. The vector-count calculating unit 115 calculates the number of the base vectors T which express the feature quantity input from the attenuating unit 116 with a linear sum. The coefficient matrix calculating unit 104 calculates a sparse solution of the coefficient matrix by using the feature quantity y input from the attenuating unit 116. The other configurations and processes of the image quality enhancing apparatus 1 are similar to those of Embodiment 2.

Figure 19:
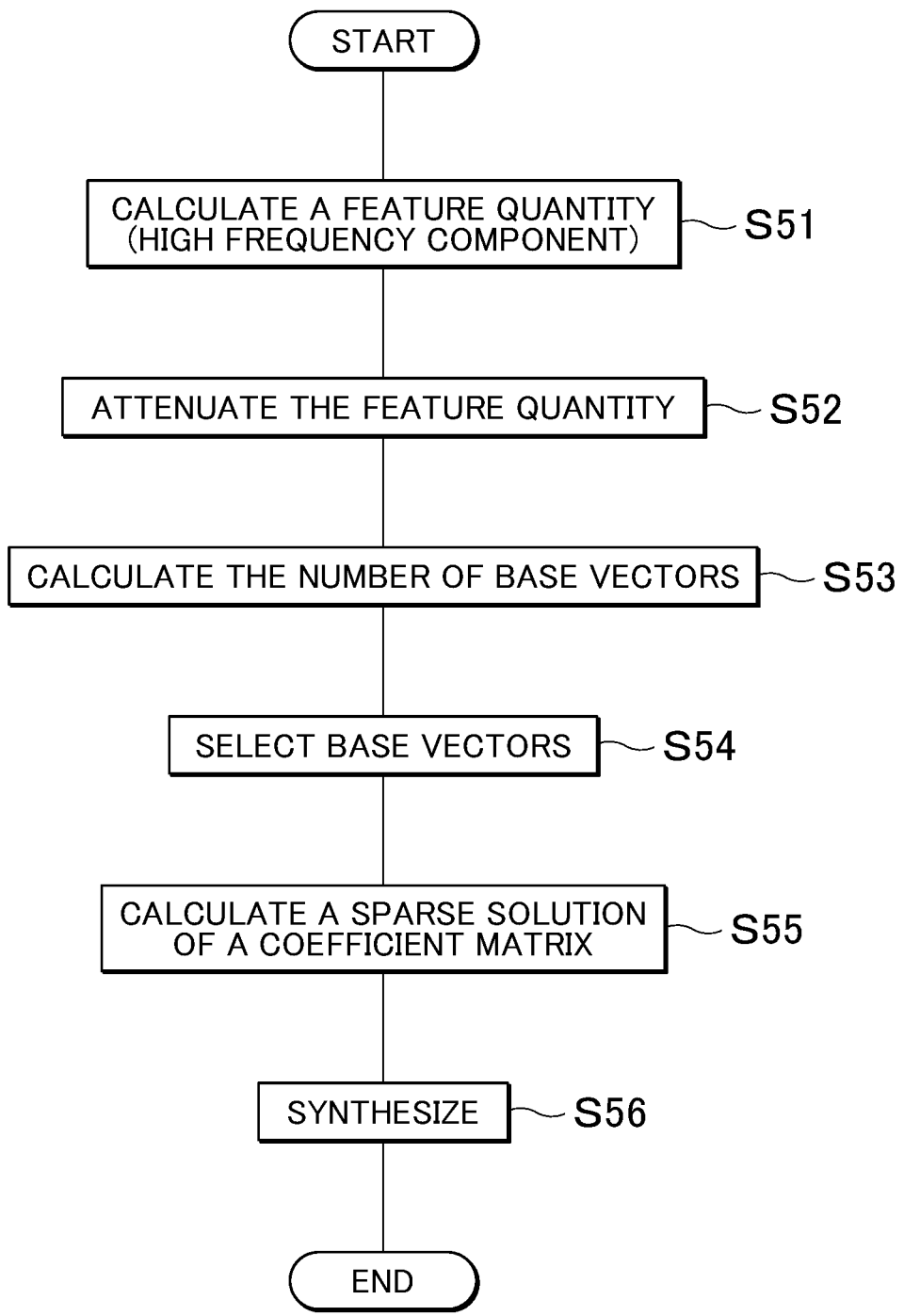
FIG. 19 is a flowchart showing the procedure of the image quality enhancement process executed by the image quality enhancing apparatus according to Embodiment 6.

FIG. 19 is a flowchart showing the procedure of the image quality enhancement process which the image quality enhancing apparatus 1 according to Embodiment 6 executes. The feature quantity calculating unit 103 calculates the feature quantity of a high frequency component of the luminance of the patch, and the filtering unit 108 calculates a low frequency component of the luminance of the patch (S51). The attenuating unit 116 attenuates the feature quantity for each pixel according to the noise (S52). The vector-count calculating unit 115 calculates the number of the base vectors T which express the feature quantity attenuated according to the noise with a linear sum (S53). The inner product calculating unit 105 and the vector selecting unit 107 select T base vectors highly influential on the feature quantity attenuated according to the noise from among n low-image-quality base vectors (S54). The coefficient matrix calculating unit 104 calculate a sparse solution x of the coefficient matrix $\alpha$ from the feature quantity attenuated according to the selected T base vectors and the noise (S55). The synthesizing unit 109 calculates a high frequency component of the luminance of the patch by using the coefficient included in the solution x and synthesizes the calculated high frequency component and a low frequency component (S56). By the processes S51 through S56, the image quality enhancing apparatus 1 generates an image with an enhanced image quality.

As above, also in the present embodiment, the image quality enhancing apparatus 1 attenuates the feature quantity in units of pixels according to the noise and performs the process of the learning-type image quality enhancement utilizing a sparse expression, as with Embodiment 6. The feature quantity is adjusted in units of pixels according to the noise, and the number of the base vectors which expresses the feature quantity of the image with a linear sum is adjusted according to the noise as well. Thus, it becomes possible to perform the image quality enhancement according to the noise more effectively. The image quality enhancing apparatus 1 may be in a form that it further comprises a function to perform a noise removal by an edge-preservation filter when the number of the base vectors with non-zero coefficients is zero, as in Embodiment 4.

(Embodiment 8)

Figure 20:
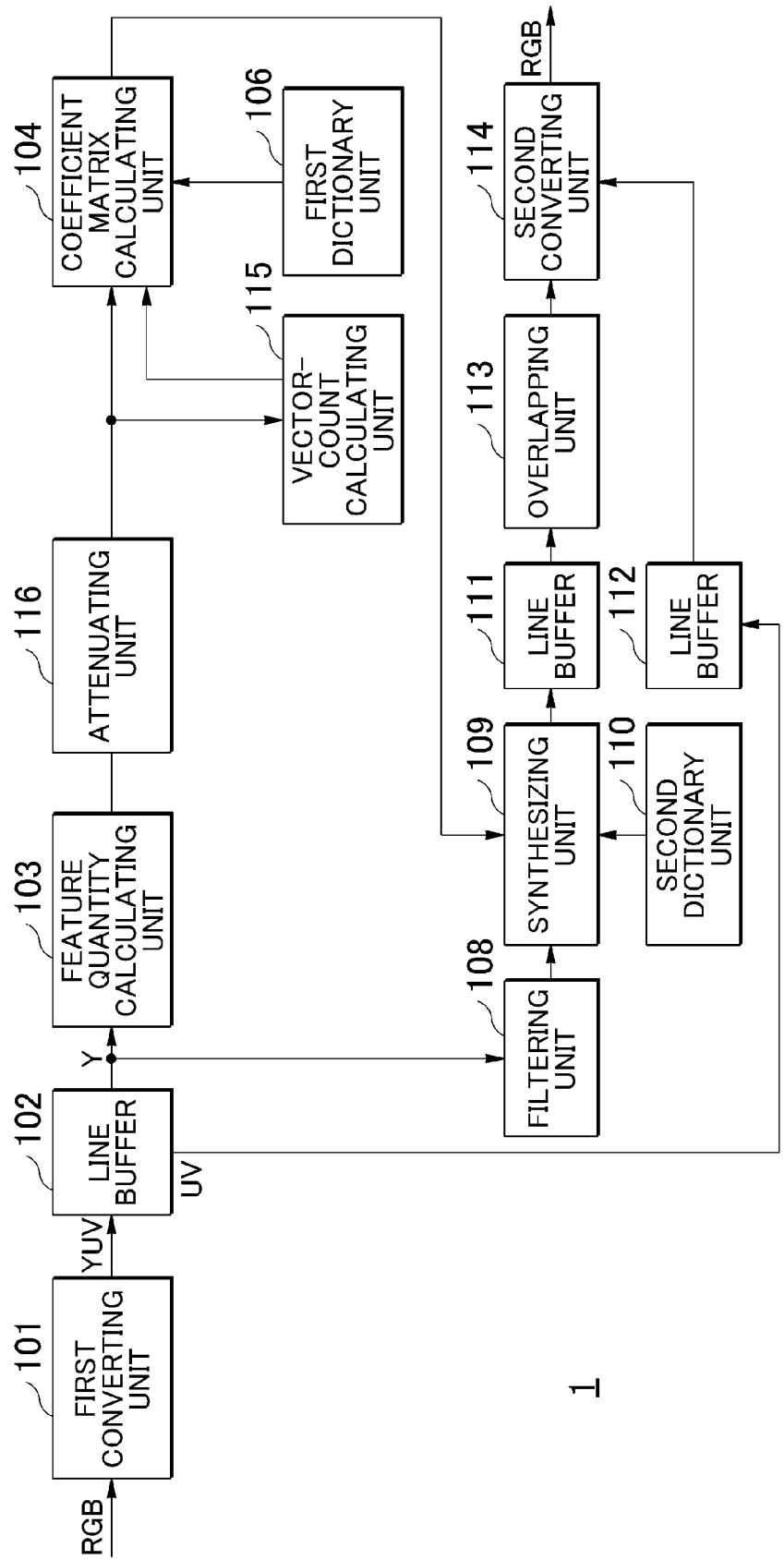
FIG. 20 is a block diagram showing the configuration of internal functions of the image quality enhancing apparatus according to Embodiment 8.

The configuration of the image display apparatus according to Embodiment 8 is similar to that of Embodiment 3. FIG. 20 is a block diagram showing the configuration of internal functions of the image quality enhancing apparatus 1 according to Embodiment 8. The image quality enhancing apparatus 1 does not comprise the inner product calculating unit 105 and the vector selecting unit 107, and the attenuating unit 116 is connected to the feature quantity calculating unit 103 and the coefficient matrix calculating unit 104. Also, the vector-count calculating unit 115 is connected to the attenuating unit 116 and the coefficient matrix calculating unit 104, and the first dictionary unit 106 is connected to the coefficient matrix calculating unit 104.

The feature quantity calculating unit 103 inputs the feature quantity y of the patch into the attenuating unit 116. The attenuating unit 116 calculates the amplification factor $\zeta$ by using Equation (9) for each pixel included in the patch and attenuates the feature quantity by multiplying the feature quantity with the amplification factor $\zeta$, as in Embodiment 6. The attenuating unit 116 inputs the feature quantity of the patch attenuated for each pixel into the vector-count calculating unit 115 and the coefficient matrix calculating unit 104. The vector-count calculating unit 115 calculates the number of the base vectors T which expresses the feature quantity input from the attenuating unit 116 with a linear sum. The coefficient matrix calculating unit 104 calculates a sparse solution of the coefficient matrix by using the feature quantity input from the attenuating unit 116. During calculation, the coefficient matrix calculating unit 104 defines the number of the base vectors T input from the vector-count calculating unit 115 as an initial value of the number of non-zero coefficients included in the coefficient matrix and calculates the sparse solution of the coefficient matrix by the iteration method, as with Embodiment 3. The other configurations and processes of the image quality enhancing apparatus 1 are similar to those of Embodiment 3.

As above, in the present embodiment, the image quality enhancing apparatus 1 attenuates the feature quantity of the image in units of pixels according to the noise and calculates a sparse solution of the coefficient matrix by the iteration method based on the attenuated feature quantity. By adjusting the intensity of the noise removal in units of pixels, it becomes possible for the image quality enhancing apparatus 1 to remove the noise while preserving the edge included in the image and to greatly enhance the image quality of the image also in the embodiment in which a coefficient matrix is calculated by the iteration method. The image quality enhancing apparatus 1 may be in a form that it further comprises a function to perform a noise removal by an edge-preservation filter when the number of the base vectors which express the feature quantity of the image with a linear sum is zero, as with Embodiment 5.

In Embodiments 1 through 8, the embodiment in which the process necessary for the image quality enhancing apparatus 1 is executed with hardware has been shown. However, the embodiment is not limited to this and the image quality enhancing apparatus 1 may be in a form that it executes a portion of or all of the process by using software. Also, in Embodiments 1 through 8, the embodiment in which the image quality enhancing apparatus 1 is incorporated in an image display apparatus has been shown. However, the image quality enhancing apparatus 1 may be in a form that it is not incorporated in the image display apparatus. For example, the image quality enhancing apparatus 1 may be in a form that it is provided in an input apparatus which inputs an image signal into the image display apparatus. Also, for example, the image quality enhancing apparatus 1 may be in a form that it is provided in the image forming apparatus such as a printer or facsimile machine.

(Embodiment 9)

Figure 21:
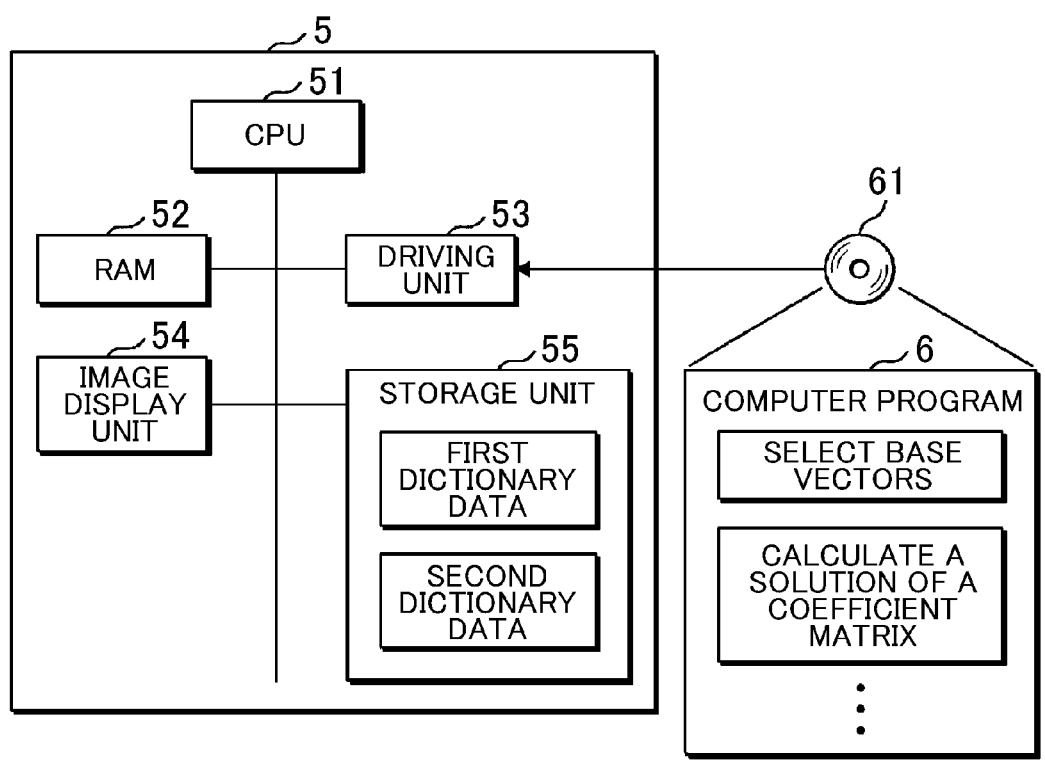
FIG. 21 is a block diagram showing the configuration of internal functions of the image quality enhancing apparatus according to Embodiment 9.

In Embodiment 9, an embodiment in which the image quality enhancing apparatus is configured by using a computer is shown. FIG. 21 is a block diagram showing the configuration of internal functions of the image quality enhancing apparatus 5 according to Embodiment 9. The image quality enhancing apparatus 5 consists of a general-purpose computer such as a personal computer and comprises a CPU (Central Processing Unit) 51 which performs operations, RAM (Random Access Memory) 52 which stores the temporary information generated with the operations, a drive unit 53 such as a CD-ROM drive which reads the information from a recording medium 61 such as an optical disk, an image display unit 54, and a storage unit 55 such as a hard disk. CPU 51 causes the drive unit 53 to read a computer program 6 from the recording medium 61 and the storage unit 55 to store the read computer program 6. The computer program 6 is loaded into RAM 52 from the storage unit 55 as necessary, and the CPU 51 executes the process necessary for the image quality enhancing apparatus 5 based on the computer program 6 loaded. The storage unit 55 stores the first dictionary data and the second dictionary data, and furthermore, it stores the data necessary for the process which CPU 51 is to execute.

The computer program 6 includes a code for causing the CPU 51 to execute the process similar to the image quality enhancing apparatuses 1 of any of Embodiments 1 through 8. The CPU 51 executes the image quality enhancement process according to the computer program 6. For example, the CPU 51 executes the process shown in the flowchart in FIG. 6 according to the computer program 6. The CPU 51 causes the image display unit 54 to display an image with the image quality enhanced.

The image quality enhancing apparatus 5 may be in a form that it fetches the computer program 6 by a method other than reading the computer program 6 from the recording medium 61 with the drive unit 53. For example, the image quality enhancing apparatus 5 may be in a form that it receives and stores the computer program 6 transmitted from outside. Also, the image quality enhancing apparatus 5 may be in a form that it comprises a storage unit 55 in which the computer program 6 is stored in advance. Also, the image quality enhancing apparatus 5 may be a smartphone or a gaming machine. Also, the image quality enhancing apparatus 5 is not limited to the form of comprising the image display unit 54, and it may be in a form that it causes an external image display apparatus to display an image with the image quality enhanced.

EXPLANATION OF REFERENCES

1 image quality enhancing apparatus
103 feature quantity calculating unit
104 coefficient matrix calculating unit
105 inner product calculating unit
106 first dictionary unit
107 vector selecting unit
108 filtering unit
109 synthesizing unit
115 vector-count calculating unit
116 attenuating unit
2 control unit
3 input unit
4 display unit
5 image quality enhancing apparatus
51 CPU
52 RAM
53 drive unit
54 image display unit
55 storage unit
6 computer program
61 recording medium

What is claimed is:

1. An image quality enhancing apparatus comprising:
    a section which stores a plurality of first feature quantities which can express a feature quantity in any image with a linear sum thereof;
    a section which stores a plurality of second feature quantities which indicate a feature quantity of a high image quality corresponding to the first feature quantities;
    a coefficient calculating section which calculates, from a feature quantity of an image targeted for image quality enhancement, a coefficient for expressing the feature quantity with the linear sum of the plurality of first feature quantities; and
    a section which generates an image which is the image with the image quality enhanced by replacing each of the first feature quantities included in the linear sum using the coefficient calculated by the coefficient calculating section with corresponding second feature quantities; wherein
    the coefficient calculating section comprises:
        a selecting section which selects fewer first feature quantities than the total number of the plurality of first feature quantities; and
        a calculating section which calculates a coefficient to be multiplied by the first feature quantities selected by the selecting section as a sparse solution by calculating an analytic solution without using the iteration method, based on the first feature quantities selected by the selecting section and the feature quantity of the image.

2. The image quality enhancing apparatus according to claim 1, wherein the calculating section is configured to make a sum of squares of differences between the linear sum and the feature quantity of the image targeted for image quality enhancement as small as possible and is furthermore configured to calculate a coefficient so as to make a sum of squares of coefficients used for the linear sum as small as possible.

3. The image quality enhancing apparatus according to claim 2, wherein the calculating section is configured to calculate an analytic solution of a coefficient which minimizes a weighted sum of a sum of squares of differences between a linear sum of the first feature quantities selected by the selecting section and the feature quantity of the image targeted for image quality enhancement and the sum of squares of the coefficients used for the linear sum.

4. The image quality enhancing apparatus according to claim 3, wherein the selecting section is configured to select a predetermined number of first feature quantities which are the closest to the feature quantity of the image targeted for image quality enhancement from among the plurality of first feature quantities.

5. The image quality enhancing apparatus according to claim 4, wherein a feature quantity, first feature quantities, and second feature quantities of an image are expressed by vectors of the same dimension, and the selecting section comprises:
- a section which calculates inner products of each of the vectors of the plurality of first feature quantities and the vector of a feature quantity of an image; and
- a section which selects a predetermined number of first feature quantities in descending order of the values of the inner products calculated by the section which calculates the inner products.

6. The image quality enhancing apparatus according to claim 2, wherein the a selecting section is configured to select a predetermined number of first feature quantities which are the closest to the feature quantity of the image targeted for image quality enhancement from among the plurality of first feature quantities.

7. The image quality enhancing apparatus according to claim 6, wherein a feature quantity, first feature quantities, and second feature quantities of an image are expressed by vectors of the same dimension, and the selecting section comprises:
- a section which calculates inner products of each of the vectors of the plurality of first feature quantities and the vector of a feature quantity of an image; and
- a section which selects a predetermined number of first feature quantities in descending order of the values of the inner products calculated by the section which calculates the inner products.

8. The image quality enhancing apparatus according to claim 1, wherein the selecting section is configured to select a predetermined number of first feature quantities which are the closest to the feature quantity of the image targeted for image quality enhancement from among the plurality of first feature quantities.

9. The image quality enhancing apparatus according to claim 8, wherein
- a feature quantity, first feature quantities, and second feature quantities of an image are expressed with vectors of the same dimension, and the selecting section comprises,
- a section which calculates inner products of each of the vectors of the plurality of first feature quantities and a vector of a feature quantity of an image; and
- a section which selects a predetermined number of first feature quantities in descending order of values of inner products calculated by the section which calculates inner products.

10. The image quality enhancing apparatus according to claim 1, further comprising:
- a section which calculates an amplification factor equal to or larger than zero and equal to or smaller than 1 which, based on a histogram indicating the relationship between a value of a predetermined noise included in each pixel of any image and a pixel count having the value, approaches zero as a pixel count in the histogram in accordance with the value of the predetermined noise corresponding to a value in each pixel of the feature quantity of the image targeted for image quality enhancement becomes larger, and approaches 1 as the pixel count becomes smaller; and
- a section which multiplies an amplification factor calculated by the section which calculates the amplification factor with the value in each pixel of the feature quantity of the image targeted for image quality enhancement.

11. An image display apparatus comprising:
the image quality enhancing apparatus according to claim 1; and
a section which displays an image with the image quality enhanced by the image quality enhancing apparatus.

12. An image quality enhancing method comprising:
storing a plurality of first feature quantities which can express a feature quantity in any image with a linear sum thereof;
storing a plurality of second feature quantities indicating a feature quantity of a high image quality corresponding to the first feature quantities;
calculating, from the feature quantity of the image which has been targeted for the image quality enhancement, a coefficient for expressing the feature quantity with the linear sum of the plurality of first feature quantities; and
generating an image that is the image with the image quality enhanced by replacing each of the first feature quantities included in the linear sum which has used the calculated coefficient with corresponding second feature quantities, wherein the method comprises:
selecting fewer first feature quantities than the total number of the plurality of first feature quantities; and
calculating a coefficient to be multiplied by the selected first feature quantities as a sparse solution by calculating an analytic solution without using the iteration method, based on selected first feature quantities and the feature quantity of the image.

13. A non-transitory computer readable storage medium storing a computer program for causing a computer, which stores a plurality of first feature quantities that can express a feature quantity in any image with a linear sum thereof and stores a plurality of second feature quantities indicating a feature quantity of a high image quality corresponding to the first feature quantities, to execute steps of:
calculating, from a feature quantity of an image targeted for image quality enhancement, a coefficient for expressing the feature quantity with the linear sum of the plurality of first feature quantities; and
generating an image that is the image with the image quality enhanced by replacing each of the first feature quantities included in the linear sum which has used the calculated coefficient with corresponding second feature quantities, wherein the step of calculating the coefficient has steps of:
selecting fewer first feature quantities than the total number of the plurality of first feature quantities; and
calculating a coefficient to be multiplied by the selected first feature quantities as a sparse solution by calculating an analytic solution without using the iteration method, based on selected first feature quantities and the feature quantity of the image.

\* \* \* \* \*